United States Patent
Ishikawa et al.

(10) Patent No.: US 7,004,883 B2
(45) Date of Patent: Feb. 28, 2006

(54) TOROIDAL-TYPE CONTINUOUSLY VARIABLE TRANSMISSION

(75) Inventors: Kouji Ishikawa, Kanagawa (JP); Yutaka Sato, Kanagawa (JP); Masami Tanaka, Kanagawa (JP); Tomofumi Yamashita, Kanagawa (JP); Nobuo Goto, Kanagawa (JP)

(73) Assignee: NSK Ltd., Tokyo (JP)

(*) Notice: Subject to any disclaimer, the term of this patent is extended or adjusted under 35 U.S.C. 154(b) by 189 days.

(21) Appl. No.: 10/228,141

(22) Filed: Aug. 27, 2002

(65) Prior Publication Data

US 2003/0060324 A1 Mar. 27, 2003

(30) Foreign Application Priority Data

Aug. 27, 2001 (JP) .................................... P. 2001-255824
Nov. 2, 2001 (JP) .................................... P. 2001-338231
Feb. 26, 2002 (JP) .................................... P. 2002-050179

(51) Int. Cl.
*F16H 15/38* (2006.01)

(52) U.S. Cl. ........................................ 476/40; 476/46
(58) Field of Classification Search .............. 476/40–46
See application file for complete search history.

(56) References Cited

U.S. PATENT DOCUMENTS 5,027,669 A * 7/1991 Nakano ...................... 476/41
6,616,568 B1 * 9/2003 Ooyama ..................... 476/40

FOREIGN PATENT DOCUMENTS

| JP | 62-71465 U | 5/1987 |
|---|---|---|
| JP | 1-173552 U | 12/1989 |
| JP | 4-96654 U | 8/1992 |
| JP | 7-229546 A | 8/1995 |
| JP | 8-178007 A | 7/1996 |
| JP | 10-331936 A | 12/1998 |
| JP | 2000-230615 A | 8/2000 |
| JP | 2001-248702 A | 9/2001 |
| JP | 2001-304366 A | 10/2001 |

OTHER PUBLICATIONS

U.S. Appl. No. 09/797,811 Hiromichi Takenura filed Mar. 5, 2001.

* cited by examiner

*Primary Examiner*—Thomas R. Hannon
*Assistant Examiner*—Timothy McAnulty
(74) *Attorney, Agent, or Firm*—Sughrue Mion, PLLC

(57) ABSTRACT

A trunnion of a toroidal-type continuously variable transmission has a support plate portion for supporting a displacement shaft and a pair of bent wall portions respectively bent toward the inner surface side of the support plate portion. The support plate portion and the pair of bent wall portions cooperates together in defining a pocket portion for storing a power roller therein. Pivot shafts are disposed concentrically with each other on the outer surfaces of the pair of bent wall portions. The pair of bent wall portions are connected together by a connecting member. The connecting member includes a pressure receive portion contactable with the inner surface of the pocket portion in a direction intersecting substantially at right angles to the thrust direction and receiving a pressing force acting on the pocket portion to crush the pocket portion.

9 Claims, 21 Drawing Sheets

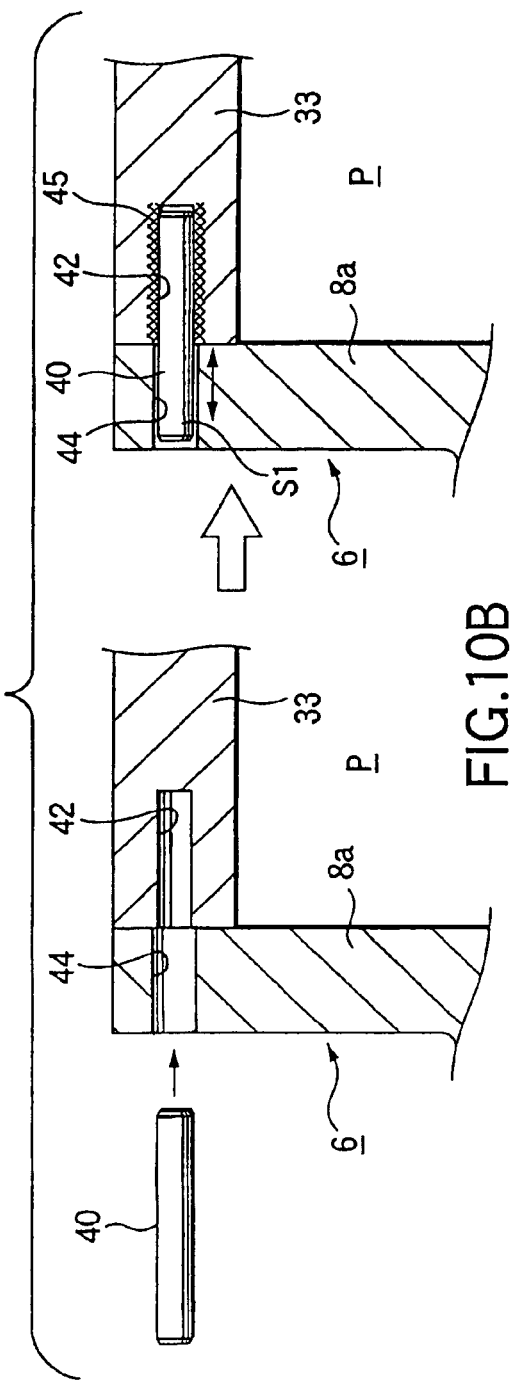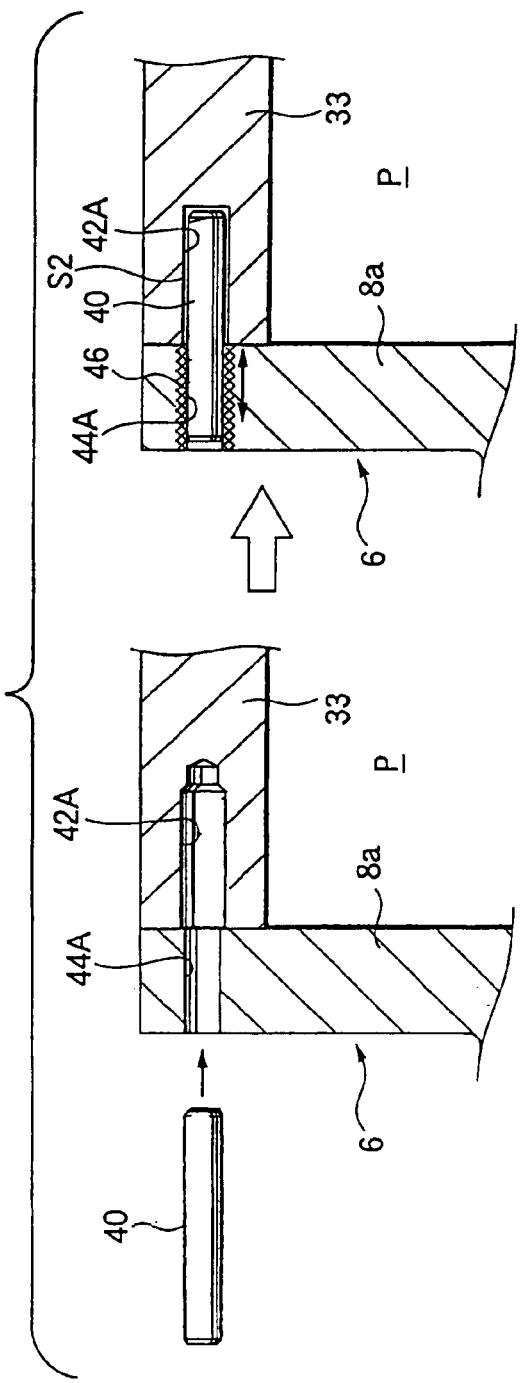

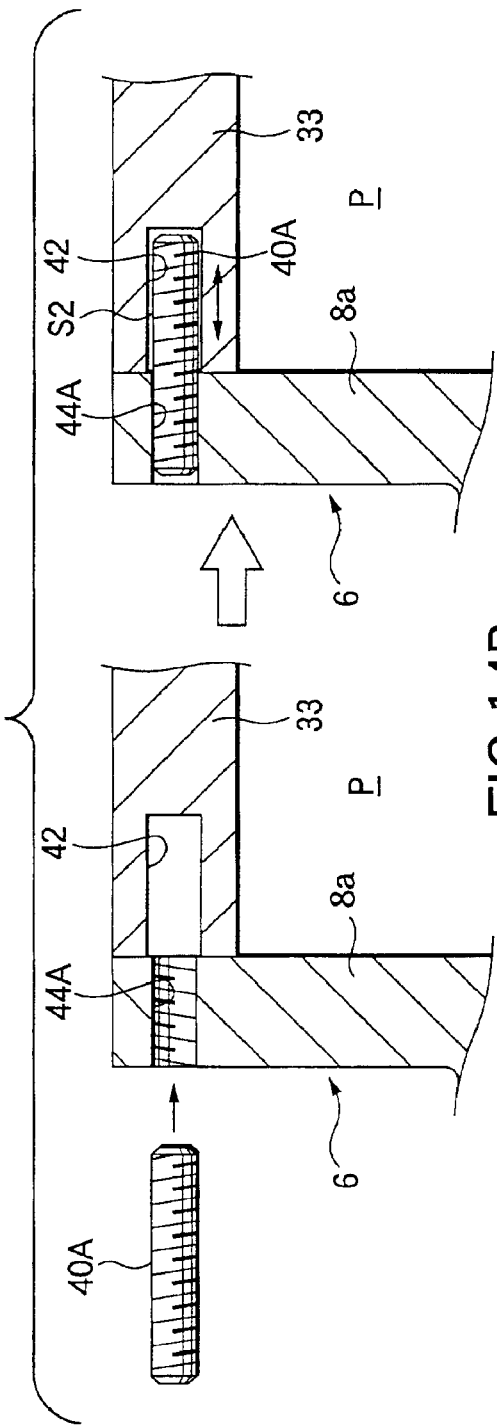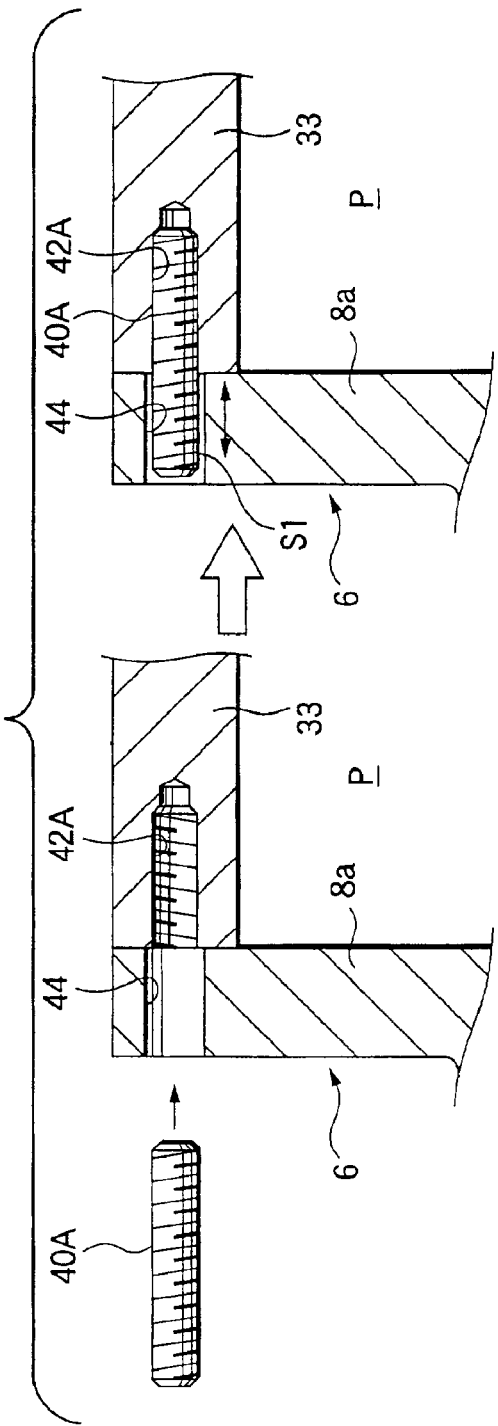

TOROIDAL-TYPE CONTINUOUSLY VARIABLE TRANSMISSION

BACKGROUND OF THE INVENTION

1. Field of the Invention

The present invention relates to a toroidal-type continuously variable transmission which can be used as a transmission for a car or various industrial machines.

2. Description of the Related Art

As a transmission for a car, conventionally, there has been partially used such a toroidal-type continuously variable transmission as shown in FIGS. 19 and 20. In the present toroidal-type continuously variable transmission, for example, as disclosed in JP-A-62-71465U, an input side disk 2 serving as a first disk is supported concentrically with an input shaft 1 and, to the end portion of an output shaft 3 which is disposed concentrically with the input shaft 1, there is fixed an output side disk 4 serving as a second disk. In the interior of a casing in which the toroidal-type continuously variable transmission is stored, there are disposed trunnions 6, 6 which can be swung about their respective pivot shafts 5, 5 disposed at twisted position with respect to the input shaft 1 and output shaft 3, which do not intersect with the center axes of the input side and output side disks 2, 4 but exist in directions at right angles or almost at right angles to the directions of the center axes of the input side and output side disks 2, 4.

That is, each of the trunnions 6, 6 is structured such that, as shown in FIG. 21 and FIG. 23 (which will be discussed later), in the two end portions of the longitudinal direction (in FIGS. 21 and 23, in the right and left direction) of a support plate portion 7 of the trunnion 6, there are formed a pair of bent wall portions 8, 8 which are respectively bent toward the inner surface side (in FIG. 21, toward the upper side) of the support plate portion 7. And, by these bent wall portions 8, 8, there is defined a recess-shaped pocket portion P in which a power roller 11 (which will be discussed later) can be stored. Also, on the outer surfaces (the surfaces on the opposite side to the support plate portion 7) of the bent wall portions 8, 8, there are disposed pivot shafts 5, 5 in such a manner that they are concentric with each other.

A circular hole 10 is formed in the central portion of the support plate portion 7 and, the base end portion of a displacement shaft 9 is supported in the circular hole 10. And, by swinging the trunnions 6, 6 about their respective pivot shafts 5, 5, the inclination angle of the displacement shafts 9 supported on the central portions of the trunnions 6, 6 can be adjusted. Power rollers 11 are rotatably supported on the peripheries of the leading end portions of the displacement shafts 9 projected out from the inner surfaces of the respective trunnions 6, 6; and, the power rollers 11, 11 are respectively held by and between the input side and output side disks 2, 4. By the way, the base end portions and leading end portions of the respective displacement shafts 9, 9 are eccentric to each other.

Each of the sections of the mutually opposing inner surfaces 2a, 4a of the input side and output side disks 2, 4 has a concave surface which can be obtained by rotating an arc having the pivot shaft 5 as a center thereof or a curved line close to such arc. And, the peripheral surfaces 11a, 11a, which are respectively formed in a spherically convex surface, of the power rollers 11, 11 are contacted with their associated inner surfaces 2a, 4a of the input side and output side disks 2, 4

A pressing device 12 of a loading cam type is interposed between the input shaft 1 and input side disk 2. This pressing device 12 elastically presses the input side disk 2 toward the output side disk 4. Also, the pressing device 12 has a cam plate 13 which can be rotated together with the input shaft 1, and a plurality of (for example, four) rollers 15, 15 respectively held by a retainer 14. Further, on one side surface (in FIGS. 19 and 20, the left-side side surface) of the cam plate 13, there is formed a cam surface 16 which is a curved surface extending over the peripheral direction of the cam plate 13; and, on the outer surface (in FIGS. 19 and 20, the right-side side surface) of the input disk 2, there is formed a similar cam surface 17. And, the plurality of rollers 15, 15 are supported such that they can be rotated about an axis which extend in the radial direction with respect to the input shaft 1.

In the thus structured toroidal-type continuously variable transmission, in case where the input shaft 1 is rotated, the cam plate 13 is rotated with the rotation of the input shaft 1, the cam surface 16 presses the plurality of rollers 15, 15 against the cam surface 17 formed on the outer surface of the input side disk 2. As a result of this, the input side disk 2 is pressed by the plurality of power rollers 11, 11 and, at the same time, due to the mutual pressing operation between the pair of cam surfaces 16, 17 and the plurality of rollers 15, 15, the input side disk 2 is rotated. And, the rotational movement of the input side disk 2 is transmitted through the respective power rollers 11, 11 to the output side disk 4, thereby being able to rotate the output shaft 3 fixed to the output side disk 4.

When changing the rotation speed between the input shaft 1 and output shaft 3, specifically, when reducing the rotation speed between the input shaft 1 and output shaft 3, the trunnions 6, 6 are swung about their respective pivot shafts 5, 5 and the displacement shafts 9, 9 are inclined in such a manner that, the peripheral surfaces 11a, 11a of the power rollers 11, 11, as shown in FIG. 19, can be respectively contacted with the near-to-center portion of the inner surface 2a of the input side disk 2 and the near-to-outer-periphery portion of the inner surface 4a of the output side disk 4.

On the other hand, when increasing the rotation speed between the input shaft 1 and output shaft 3, the trunnions 6, 6 are swung and the displacement shafts 9, 9 are inclined in such a manner that, the peripheral surfaces 11a, 11a of the power rollers 11, 11, as shown in FIG. 20, can be respectively contacted with the near-to-outer-periphery portion of the inner surface 2a of the input side disk 2 and the near-to-center portion of the inner surface 4a of the output side disk 4. And, in case where the inclination angles of the displacement shafts 9, 9 are set intermediate between the angles in FIGS. 19 and 20, there can be obtained an intermediate transmission ratio between the input shaft 1 and output shaft 3.

Further, FIGS. 22 and 23 show a more specified version of the toroidal-type continuously variable transmission which is disclosed in JP-A-1-173552U. In this structure, the input side disk 2 and the output side disk 4 are respectively supported on the periphery of a circular-pipe-shaped input shaft 18 through their associated needle roller bearings 19, 19 in such a manner that they can be rotated as well as can be shifted in the axial direction thereof. Also, the cam plate 13, which is used to constitute the pressing device 12 of a loading cam type, is spline engaged with the outer peripheral surface of the end portion (in FIG. 22, the left end portion) of the input shaft 18, while the cam plate 13 is prevented from moving apart from the input side disk 2 by a flange portion 20. Further, an output gear 21 is connected to the output side disk 4 by keys 22, 22, while the output side disk 4 and output gear 4 can be rotated synchronously.

On the two end portions of each of a pair of trunnions 6, 6 each having such a structure as shown in the previously described FIG. 21, there are disposed pivot shafts 5, 5 respectively; and, these pivot shafts 5, 5 are supported in such a manner that they can be swung with respect to a pair of support plates 23, 23 and can be shifted in the axial direction thereof (in FIG. 22, in the front and back direction; and, in FIG. 23, in the right and left direction). That is, the pivot shafts 5, 5 are supported inside support holes 23a formed in the support plates 23, 23 by radial needle roller bearings 32.

And, in the circular holes 10 formed in the central portions of the support plate portions 7 which constitute their respective trunnions 6, 6, there are rotatably supported the base end portions 9a of displacement shafts 9 each structured such that the base end portion 9a and leading end portion 9b thereof are parallel to and eccentric to each other. Also, the power roller 11 is rotatably supported on the periphery of the leading end portion 9b of each of the displacement shafts 9 projected from the inner surfaces of their respective support plate portions 7.

By the way, the pair of displacement shafts 9, 9, which are disposed on each pair of trunnions 6, 6, are arranged at positions which are situated on the 180° opposite side to each other with respect to the input shaft 18. Also, a direction, in which the leading end portions 9b of the displacement shafts 9, 9 are eccentric to their respective base end portions 9a, is the same direction (in FIG. 23, in the right and left reversed direction) as the rotation direction of the input side and output side disks 2, 4. Also, this eccentric direction is a direction which intersect substantially at right angles to the direction in which the input shaft 18 is arranged. Therefore, the power rollers 11, 11 are supported in such a manner that they can be slightly shifted in the longitudinal direction of the input shaft 18. As a result of this, in case where the power rollers 11, 11 tend to shift in the axial direction of the input shaft 18 due to the elastic deformation of the respective component parts of the toroidal-type continuously variable transmission caused by a thrust load generated by the pressing device 12, an unreasonable force can be prevented from being applied to the respective component parts, so that the shifting movements of the power rollers 11, 11 can be absorbed.

Also, between the outer surfaces of the power rollers 11, 11 and the inner surfaces of the support plate portions 7 constituting the trunnions 6, 6, there are interposed thrust ball bearings 24 (which are thrust rolling bearings) and thrust needle roller bearings 25 in the order starting from the outer surfaces of the power rollers 11. Of these bearings, each of the thrust ball bearing 24, while supporting a thrust-direction load applied to each of the power rollers 11, allows the rotation of the present power roller 11. Each of the thrust ball bearing 24 includes a plurality of balls 26, 26, a circular-ring-shaped retainer 27 for holding the balls 26, 26 in a rollable manner, and a circular-ring-shaped outer race 28. Also, the inner race raceway of each of the thrust ball bearings 24 is formed in the outer surface of its associated power roller 11, while the outer race raceway of each of the thrust ball bearings 24 is formed in the inner surface of its associated outer race 28.

Also, the thrust needle roller bearings 25 are held by and between the inner surfaces of the support plate portions 7 constituting their respective trunnions 6, 6 and the outer surfaces of the associated outer races 28. The thus arranged thrust needle roller bearings 25, while supporting thrust loads applied from their respective power rollers 11 to the their respective outer races 28, allow these power rollers 11 and outer races 28 to be swung and shifted about the base end portions 9a of their respective displacement shafts 9.

Further, drive rods 29 are respectively connected to the one-end portions (in FIG. 23, the left end portions) of the trunnions 6, 6, while drive pistons 30 are respectively fixed to the outer peripheral surface in the intermediate portions of their associated drive rods 29. And, these drive pistons 30 are respectively inserted oil-tight into their associated drive cylinders 31.

In the case of the thus structured toroidal-type continuously variable transmission, the rotational movement of the input shaft 18 is transmitted through the pressing device 12 to the input side disk 2. And, the rotational motion of the input side disk 2 is transmitted through the pair of power rollers 11, 11 to the output side disk 4 and, further, the rotation power of the output side disk 4 is taken out by the output gear 21.

Now, when changing the rotation speed ratio between the input shaft 18 and output gear 21, the pair of drive pistons 30, 30 are shifted in the mutually opposite directions. As the pair of drive pistons 30, 30 are shifted in this manner, the pair of trunnions 6, 6 are shifted in the mutually opposite directions. For example, the power roller 11 situated on the lower side in FIG. 23 is shifted to the right in FIG. 23, whereas the power roller 11 situated on the upper side in FIG. 23 is shifted to the left in FIG. 23. This changes the direction of tangential-direction forces acting on the contact portions between the peripheral surfaces 11a, 11a of the power rollers 11, 11 and the inner surfaces 2a, 4a of the input side and output side disks 2, 4. And, due to such change of the direction of the tangential-direction forces, the trunnions 6, 6 are swung in the mutually opposite directions about their respective pivot shafts 5, 5 which are pivotally supported on the support plates 23, 23.

As a result of this, as shown in FIGS. 19 and 20 which have been previously discussed, the mutual contact positions between the peripheral surfaces 11a, 11a of the power rollers 11, 11 and the inner surfaces 2a, 4a of the input side and output side disks 2, 4 are changed, which in turn changes the rotation speed ratio between the input shaft 18 and output gear 21. Also, in case where torque to be transmitted between the input shaft 18 and output gear 21 varies to thereby change the elastic deformation amounts of the respective component parts, the power rollers 11, 11 and outer races 28 belonging to these power rollers 11, 11 are slightly rotated about the base end portions 9a of their respective displacement shafts 9. Since, between the outer surfaces of the outer races 28 and the inner surfaces of the support plate portions 7 constituting the trunnions 6, there are interposed their associated thrust needle roller bearings 25, the above slight rotation can be attained smoothly. Therefore, as has been described before, there is required only a small force to change the inclination angles of the respective displacement shafts 9, 9.

When the above-described conventional toroidal-type continuously variable transmission is in operation, to the power rollers 11 which are rotatably supported on the inner surface side (pocket portion P side) of the respective trunnions 6, 6, there are applied thrust loads from the inner surfaces 2a, 4a of the input side and output side disks 2, 4. And, these thrust loads are transmitted through the thrust ball bearings 24 and thrust needle roller bearings 25 to the inner surfaces of the support plate portions 7 constituting the trunnions 6. Therefore, when the toroidal-type continuously variable transmission is in operation, the trunnions 6, 6, as shown exaggeratedly in FIG. 21, are elastically deformed although slightly in the direction where the inner surface sides of the trunnions 6, 6, where the power roller 11 are situated, can provide concave surfaces.

And, in case where such elastic deformation amount increases, the thrust loads applied to the balls 26, 26 which are rolling bodies constituting the thrust ball bearings 24 and the needle rollers constituting the thrust needle roller bearings 25 are made uneven. That is, as a result of the elastic deformation of the respective trunnions 6, the distances between the inner surfaces of the support plate portions 7 constituting the trunnions 6 and the outer surfaces of the power rollers 11 are made uneven. This reduces the thrust loads to be applied to the rolling bodies existing in the portion where the distance between these mating surfaces are increased, whereas this increases the thrust loads to be applied to the rolling bodies existing in the portion where the distance between these mating surfaces are reduced. As a result of this, an excessively large thrust load is applied to some of the rolling bodies to thereby increase excessively the contact pressures between the present rolling bodies and the raceway surfaces with which the rolling surfaces of the present rolling bodies are contacted, which shortens greatly the fatigue lives of these rolling surfaces and raceway surfaces.

Also, stresses are easy to concentrate on the connecting portion A (see FIG. 24) between the pivot shafts 5, 5 (which are disposed on the two end portions of each of the trunnion 6 and serve as the rolling surfaces of the incliningly rolling bearings) and the support plate portion 7 for supporting the power roller 11; and, therefore, in case where excessive torque is input to thereby elastically deform the trunnion 6 in the above-mentioned manner, the connecting portion A can be easily damaged, for example, it can be cracked. To avoid this, conventionally, the thickness of the trunnion 6 is increased to thereby prevent such damage. However, in this case, undesirably, the size of the trunnion 6 increases to thereby increase not only the weight thereof but also the cost thereof. Also, the pivot shafts 5 and support plate portions 7 must be connected together with a larger radius than necessary, which raises another problem when working them.

Also, in case where the trunnion 6 is elastically deformed in such a manner as shown in FIG. 21, the displacement shaft 9 is inclined with respect to the trunnion 6. In this case, stresses concentrate on the engaging portion B (see FIG. 24) between the base end portion 9a of the displacement shaft 9 and trunnion 6, so that the engaging portion B can be easily damaged, for example, cracked. Also, in case where the displacement shaft 9 is inclined with respect to the trunnion 6, the position of the power roller 11 supported on the leading end portion 9b of the displacement shaft 9 is shifted and the contact points between the peripheral surface 11a of the power roller 11 and the inner surfaces 2a, 4a of the input side and output side disks 2, 4 are shifted from their respective given positions, thereby making the transmission operation unstable.

SUMMARY OF THE INVENTION

The present invention aims at eliminating the above-mentioned drawbacks found in the conventional toroidal-type continuously variable transmission. Accordingly, it is an object of the invention to provide a toroidal-type continuously variable transmission which can prevent the action of a connecting member for prevention of the elastic deformation of a trunnion, can prevent the connecting member from slipping out of the trunnion, and is easy to work and assemble.

In attaining the above object, according to a first aspect of the invention, there is provided a toroidal-type continuously variable transmission, including:

first and second disks each including an inner surface, the first and second disks being disposed concentrically and rotatably such that the respective inner surfaces are opposed to each other;

a trunnion swingable about pivot shafts disposed at twisted positions with respect to center axes of the first and second disks;

a displacement shaft supported on the trunnion;

a power roller held between the first and second disks while being rotatably supported on the periphery of the displacement shaft; and, a bearing allowing the rotation of the power roller while supporting a load applied to the power roller in a thrust direction;

wherein the trunnion includes a support plate portion for supporting the displacement shaft and a pair of bent wall portions respectively bent toward the inner surface side of the support plate portion, the support plate portion and the pair of bent wall portions cooperates together in defining a pocket portion for storing the power roller therein, the pivot shafts are disposed concentrically with each other on the outer surfaces of the pair of bent wall portions, the pair of bent wall portions are connected together by a connecting member, and the connecting member includes a pressure receive portion contactable with the inner surface of the pocket portion in a direction intersecting substantially at right angles to the thrust direction and receiving a pressing force acting on the pocket portion to crush the pocket portion.

According to a second aspect of the invention, the toroidal-type continuously variable transmission according to the first aspect, wherein the connecting member further includes a contact surface being contacted with the trunnion in the thrust direction at the outside of the pocket portion.

According to a third aspect of the invention, the toroidal-type continuously variable transmission according to the first aspect, wherein an interference is formed between the pressure receive portion of the connecting member and the inner surface of the pocket portion to be contacted with the pressure receive portion, and the pressure receive portion is pressure inserted into the pocket portion with interference fit.

According to a fourth aspect of the invention, the toroidal-type continuously variable transmission according to the first aspect, wherein the connecting member includes a removal preventive member for preventing the connecting member from being removed from the trunnion in the thrust direction.

According to a fifth aspect of the invention, the toroidal-type continuously variable transmission according to the first aspect, wherein at least one of the pressure receive portion of the connecting member and the inner surface of the pocket portion to be contacted with the pressure receive portion of the connecting member is inclined at a given angle with respect to the thrust direction.

According to the sixth aspect of the invention, there is provided a toroidal-type continuously variable transmission, comprising:

first and second disks each including an inner surface, the first and second disks being disposed concentrically and rotatably such that the respective inner surfaces are opposed to each other;

a trunnion swingable about pivot shafts disposed at twisted positions with respect to center axes of the first and second disks;

a displacement shaft supported on the trunnion;

a power roller held between the first and second disks while being rotatably supported on the periphery of the displacement shaft; and, a bearing allowing the rotation of the power roller while supporting a load applied to the power roller in a thrust direction;

wherein the trunnion includes a support plate portion for supporting the displacement shaft and a pair of bent wall portions respectively bent toward the inner surface side of the support plate portion, the support plate portion and the pair of bent wall portions cooperates together in defining a pocket portion for storing the power roller therein, the pivot shafts are disposed concentrically with each other on the outer surfaces of the pair of bent wall portions, the pair of bent wall portions are connected together by a connecting member, and at least one end portion of the connecting member is connected to the bent wall portion by a fastening member.

According to a seventh aspect of the invention, the toroidal-type continuously variable transmission according to the sixth aspect, wherein only one end portion of the fastening member is fixed to one of the connecting member and the bent wall portion, thereby allowing the connecting member and the bent wall portion to move with respect to each other along the axial direction of the fastening member.

According to an eighth aspect of the invention, the toroidal-type continuously variable transmission according to the sixth aspect, wherein the two end portions of the connecting member are respectively connected to the bent wall portions by the fastening member.

According to a ninth aspect of the invention, the toroidal-type continuously variable transmission according to the sixth aspect, wherein the connecting member is disposed within the pocket portion.

According to a tenth aspect of the invention, the toroidal-type continuously variable transmission according to the sixth aspect, wherein a stopper is disposed in the vicinity of the trunnion, for preventing the swing motion of the trunnion about the pivot shafts from going beyond an allowed limit thereof, and a contact portion to be contacted with the stopper is formed in the connecting member.

According to the invention, the pocket portion crushing force can be received in the crushing direction directly by the pressure receive portion which can be contacted with the inner surface of the pocket portion. This not only can prevent the elastic deformation of the trunnion effectively but also can reduce stresses to be applied onto the connecting portions between the pivot shafts and the support plate portion of the trunnion.

Also, according to the invention, since the contact surface of the connecting member can prevent the trunnion from falling down in the thrust direction, the stresses to be applied onto the connecting portions between the pivot shafts and the support plate portion of the trunnion can be reduced further.

Further, according to the invention, the pressure receive portion of the connecting member is pressure inserted into the pocket portion with interference fit to thereby be able to relieve the bending deformation of the trunnion. Also, such interference fit can prevent the connecting member from being removed from the trunnion in the thrust direction.

Still further, according to the invention, the connecting member can be fixed to the trunnion firmly.

In addition, according to the invention, since, when the trunnion is deformed, the inclined surface of one of the connecting member and trunnion bites into its mating member like a wedge, the deformation of the trunnion can be restricted further. Also, the wedge-like biting of the inclined surface into the mating member can prevent the connecting member from being removed from the trunnion in the thrust direction.

In the invention, since the trunnion and connecting member are produced as separate parts, they are easy to work. And, because the trunnion and connecting member are connected together through a fastening member, removal of the connecting member from the trunnion can be prevented. Also, since a pair of bent wall portions respectively formed on the two end portions of the trunnion in the longitudinal direction thereof are connected together by a connecting member, the bending rigidity of the trunnion can be enhanced. Therefore, even in case where a thrust load is applied to the inner surface of a support plate portion constituting the present trunnion with the operation of the toroidal-type continuously variable transmission, the trunnion is difficult to be elastically deformed.

Also, in the invention, the fastening member is not fixed to both of the trunnion and connecting member, but only one end portion of the fastening member is fixed to the connecting member or trunnion to thereby allow the trunnion and connecting member to move with respect to each other. Thanks to this, the power from the trunnion can be transmitted to the connecting member smoothly without applying an unreasonable load to the fastening member and its peripheral portion. This allows the connecting member to fulfill its original function sufficiently. Also, since the close connection between the trunnion and connecting member is not perfect close connection, the trunnion and connecting member are easy to work, fit and assemble.

Further, according to the invention, because the connecting member is interposed between the two bent wall portions which define the pocket portion, the respective bent wall portions are difficult to be elastically deformed in a direction where they approach each other, thereby being able to enhance the bending rigidity of the trunnion further.

Still further, according to the invention, the transfer surface portion of the trunnion with respect to a bearing supporting the inclined rotation of the trunnion is treated by heat treatment such as a through hardening, high-frequency induction hardening, and carburizing to thereby enhance the surface hardness thereof, which prevents the transfer surface portion from being worn due to its contact with the bearing.

Here, in the case of a trunnion in which a connecting member according to the invention is not disposed, the inclined rotation of the trunnion can be prevented by the portion of the trunnion adjacent to the transfer surface portion thereof because it is contacted with the stopper. Therefore, the contact portion of the trunnion with respect to the stopper is heat-treated for prevention of wear. However, since the transfer surface portion and contact portion are situated adjacent to each other, there is generated a portion which is heat-treated twice. As a result of this, there occur quenching cracks and lowered hardness in the twice-heat-treated portion, which results in the lowered durability of the trunnion.

On the other hand, according to the invention, since the contact portion of the connecting member is contacted with the stopper, a heat treatment for prevention of wear is enforced separately on the inclined rotation surface of the trunnion and on the contact portion of the connecting member. Therefore, the heat treatment is executed once on the trunnion, not twice, which can prevent the lowered durability of the trunnion.

BRIEF DESCRIPTION OF THE DRAWINGS

FIG. 10A is an enlarged section view of the main portions of a toroidal-type continuously variable transmission according to a modification 1 of the sixth embodiment of the invention;

FIG. 10B is an enlarged section view of the main portions of a toroidal-type continuously variable transmission according to a modification 2 of the sixth embodiment of the invention;

FIG. 14A is an enlarged section view of the main portions of a toroidal-type continuously variable transmission according to a modification 3 of the sixth embodiment of the invention;

FIG. 14B is an enlarged section view of the main portions of a toroidal-type continuously variable transmission according to a modification 4 of the sixth embodiment of the invention;

DETAILED DESCRIPTION OF THE PREFERRED EMBODIMENTS

Figure 1:
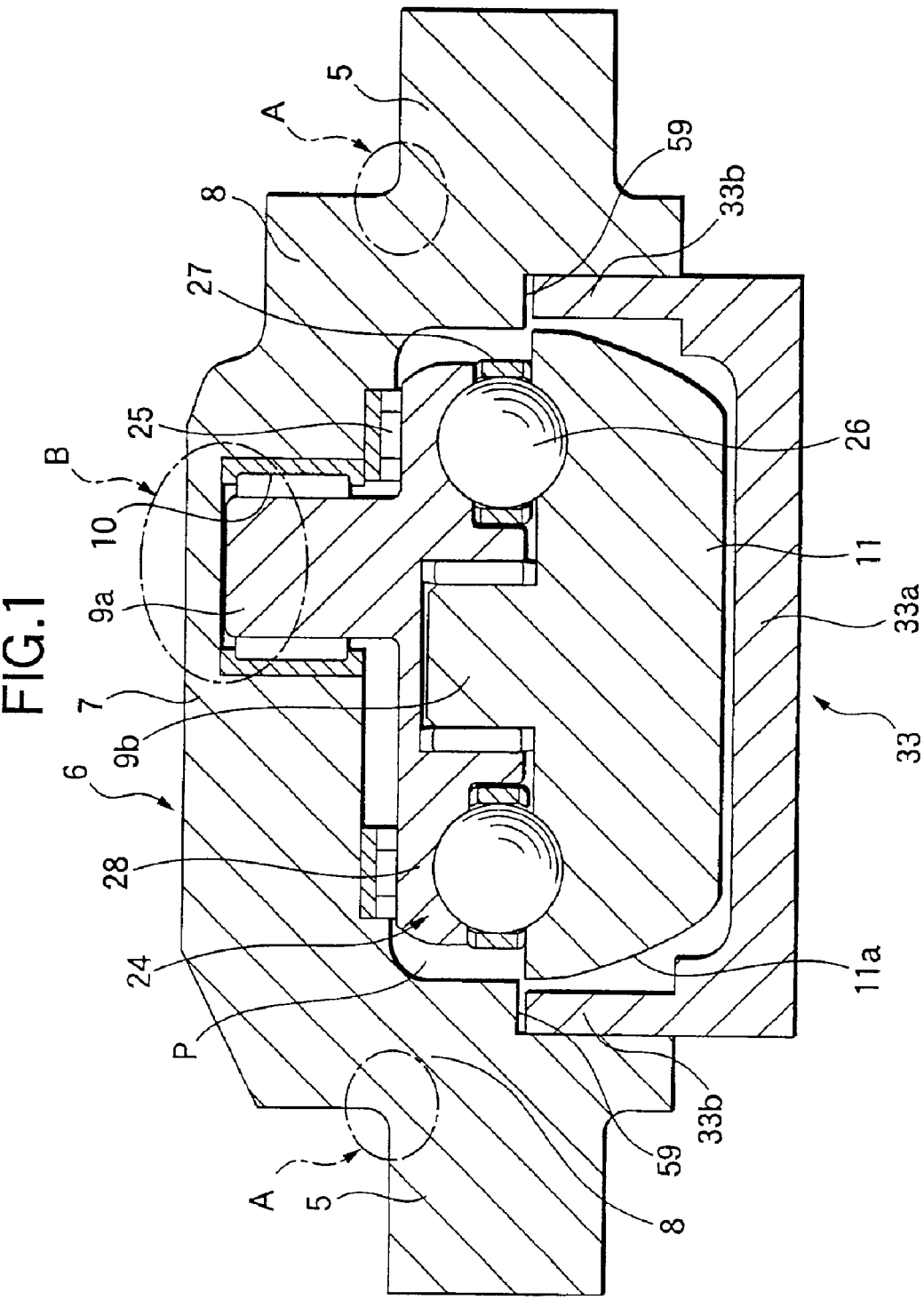
FIG. 1 is an enlarged section view of a trunnion employed in a toroidal-type continuously variable transmission according to a first embodiment of the invention, corresponding to a trunnion disposed on the upper side in FIG. 19.

Now, description will be given below of the preferred embodiments of a toroidal-type continuously variable transmission according to the invention with reference to the accompanying drawings. By the way, the present invention is characterized in that, when the toroidal-type continuously variable transmission is in operation, the support plate portion 7 of the trunnion 6 can be effectively prevented from being deformed by a thrust load which is applied from the power roller 11 through the thrust ball bearing 24 and thrust needle roller bearing 25 to the inner surface of the support plate portion 7; and, the other remaining structures and operations of the invention are similar to those of the previously described conventional toroidal-type continuously variable transmission. Therefore, in the following description, only the characteristic portions of the invention will be discussed, whereas the remaining portions of the invention are given the same designations as shown in FIGS. 19 to 24 and thus the detailed description thereof is omitted.

Now, FIG. 1 shows a first embodiment of a toroidal-type continuously variable transmission according to the invention. As shown in FIG. 1, a trunnion 6 constituting a toroidal-type continuously variable transmission according to the invention, similarly to the trunnion 6 used in the previously described conventional toroidal-type continuously variable transmission, includes, on the two end portions thereof in the longitudinal direction (in FIG. 1, in the right and left direction) of the support plate portion 7, a pair of bent wall portions 8, 8 formed such that they are bent toward the inner surface side (in FIG. 1, the upper side) of the support plate portion 7. And, on the outer surfaces of the bent wall portions 8, 8, there are disposed pivot shafts 5, 5 in such a manner that they are concentric with each other.

Also, in the present embodiment, the base end portion 9a of the displacement shaft 9 and outer race 28 according to the conventional structure are formed as an integral body, and the leading end portion 9b of the displacement shaft 9 and power roller 11 are also formed as an integral body. And, a circular hole 10, which is formed in the central portion of the support plate portion 7 for supporting the base end portion 9a of the displacement shaft 9, does not penetrate through the support plate portion 7, and one end side (the opposite side to the pocket portion P where the power roller 11 is to be stored) of the circular hole 10 is closed; that is, the circular hole 10 is formed as a bag with one side thereof closed.

Also, in the case of the trunnion 6 according to the present embodiment, on the inner surface side (pocket portion P side) of the trunnion 6 where the power roller 11 is situated, there is disposed a connecting member 33 which restricts the inner surface side of the trunnion 6 from being elastically deformed in a direction where the inner surface side of the trunnion 6 can be turned into a concave surface. The connecting member 33 includes a main body portion 33a which extends between the leading end portions of a pair of bent wall portions 8, 8, and a pair of pressure receive portions 33b, 33b which are formed in the two end portions of the main body portion 33a and are contacted with the inner surfaces of the pocket portion P (specifically, the inner surfaces of the bent wall portions 8, 8) in a sufficient wide range to be able to receive directly a pressing force for crushing the pocket portion P in the crushing direction. In this case, the pressure receive portions 33b are contacted with the inner surfaces of the pocket portion P in a direction intersecting the thrust direction substantially at right angles, and can be connected by welding to the trunnion 6. By the way, the connecting member 33 is formed as a bridge-shaped member, for example, by enforcing a working operation for obtaining a large rigidity such as a forging operation on mother material having sufficient rigidity such as steel.

The thus formed connecting member 33 may be connected to and fixed to the trunnion 6 after the displacement shaft 9, power roller 11, thrust ball bearing 24 and thrust needle roller bearing 25 are assembled to the trunnion 6. That is, firstly, the pressure receive portions 33b are inserted into the pocket portion P and are butted against the inner surfaces of the pocket portion P and, at the same time, the end portions of the pressure receive portions 33b are butted against, for example, stepped portions 59 which are formed in the interior of the pocket portion P; and, the main body portion 33a is disposed so as to extend over the power roller 11. And, in this state, the pressure receive portions 33b are connected by welding to the trunnion 6, for example, from the side opening of the pocket portion P.

In a state where the connecting member 33 is connected to and fixed to the trunnion 6, the power roller 11 is arranged between the connecting member 33 and the support plate portion 7 of the trunnion 6. However, the portions of the power roller 11, which can be contacted with the inner surfaces 2a, 4a of the input side and output side disks 2, 4 (see FIGS. 19, 20, and 22), are exposed from the side edge of the connecting member 33 (the side opening of the, pocket portion P). In order that the portion of the peripheral surface 11a of the power roller 11 exposed from the side edge of the connecting member 33 can be contacted with the inner surfaces 2a, 4a of the input side and output side disks 2, 4, the shape and size of the connecting member 33 may be set in such a manner that the connecting member 33 can be prevented from interfering with the input side and output side disks 2, 4 regardless of the swing motion of the trunnion 6.

As described above, in the toroidal-type continuously variable transmission according to the present embodiment, since the pair of bent wall portions 8, 8 respectively disposed on the two end portions of the trunnion 6 in the longitudinal direction thereof are connected to each other by the connecting member 33, the bending rigidity of the trunnion 6 can be enhanced. For this reason, even in case where a thrust load going upward in FIG. 1 is applied to the inner surface of the support plate portion 7 constituting the present trunnion 6 due to operation of the toroidal-type continuously variable transmission, the trunnion 6 is hard to be elastically deformed. Especially, because the connecting member 33 according to the present embodiment includes the pressure receive portions 33b, 33b which can be contacted with the inner surfaces of the pocket portion P (specifically, the inner surfaces of the bent wall portions 8, 8) in a sufficiently wide range to thereby be able to receive directly the pocket portion P crushing force in the crushing direction, the elastic deformation of the trunnion 6 can be prevented effectively. That is, the pressure receive portions 33b are able to receive and support the pocket portion P crushing force in the crushing direction effectively and, therefore, the restricting force of the connecting member 33 for restricting the elastic deformation of the trunnion 6 is able to act effectively in a direction to resist the pocket portion P crushing force. Accordingly, variations in the clearance between the leading edges of the pair of bent wall portions 8, 8 can be restricted, which makes it possible to prevent the elastic deformation of the trunnion 6 effectively. Also, since the pressure receive portions 33b are able to receive the pocket portion P crushing force in a relatively wide area, the pocket portion P crushing force can be dispersed and transmitted to the main body portion 33a. This can eliminate the possibility of the stresses being concentrated on the connecting member 33, thereby being able to prevent the connecting member 33 against damage.

Also, thanks to such effective prevention of the elastic deformation of the trunnion 6, even in case where excessive torque is input, stresses can be prevented from concentrating on the connecting portions A between the respective pivot shafts 5, 5 and support plate portion 7 (that is, stresses can be reduced); and thus, even in case where the thickness of the trunnion 6 is not increased specially, damage such as cracks can be made difficult to occur in the base end portions of the respective pivot shafts 5, 5. This not only can reduce the weight and cost of the trunnion but also can reduce the size of the trunnion. Also, the inclination of the displacement shaft 9 due to the deformation of the trunnion 6 can be prevented and thus the position of the power roller 11 supported on the leading end portion 9b of the displacement shaft 9 can be prevented from shifting, which makes it possible to stabilize the transmission operation of the toroidal-type continuously variable transmission. By the way, in the present embodiment, since the circular hole 10 of the central portion of the support plate portion 7 supporting the base end portion 9a of the displacement shaft 9 is formed in a bag shape which does not penetrate through the support plate portion 7 but one end side of the circular hole 10 is closed, even in case where the displacement shaft 9 is inclined with respect to the trunnion 6, there can be avoided a fear that stresses can concentrate on the engaging portion B between the base end portion 9a of the displacement shaft 9 and trunnion 6 to thereby cause damage such as cracks in the engaging portion B.

Figure 2:
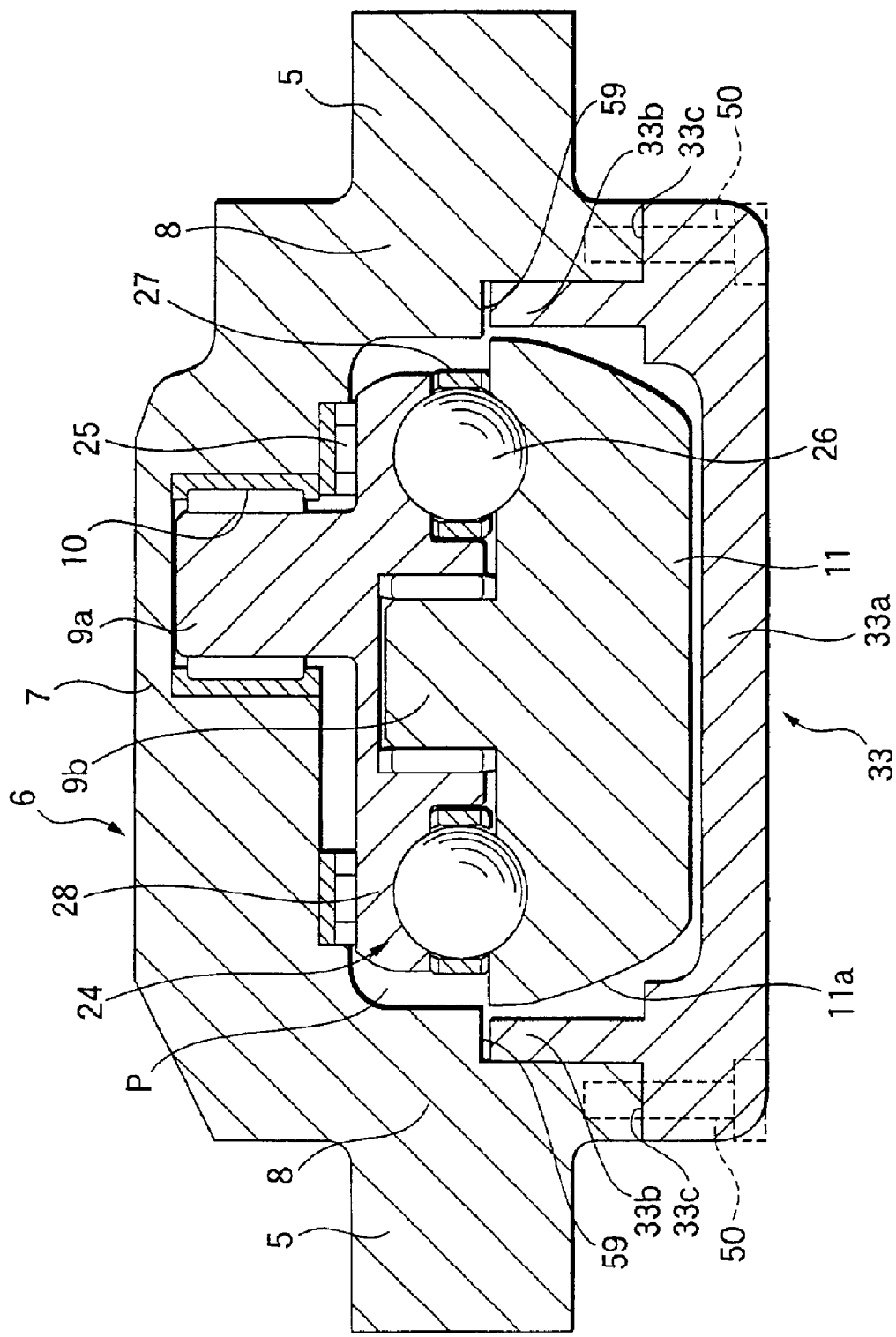
FIG. 2 is an enlarged section view of a portion of a toroidal-type continuously variable transmission according to a second embodiment of the invention, corresponding to the portion shown in FIG. 1.

Now, FIG. 2 shows a second embodiment of a toroidal-type continuously variable transmission according to the invention. By the way, the present embodiment is a modification of the first embodiment. Therefore, the component parts thereof used in common with the first embodiment are given the same designations and thus the description thereof is omitted here.

As shown in FIG. 2, a connecting member 33 according to the present embodiment includes contact surfaces 33c which, outside the pocket portion P of a trunnion 6, can be contacted with the inside end portion of the trunnion 6 (that is, the end face portion of the trunnion that is situated in the peripheral edge of the pocket portion P) in a thrust direction (in FIG. 2, in the vertical direction) to thereby receive the bending-direction force of the trunnion 6 in the thrust direction.

According to the present structure of the connecting member 33, since the trunnion 6 can be prevented from falling down in the thrust direction by the contact surfaces 33c, stresses to be applied to the connecting portions A between the pivot shafts 5 of and support plate portion 7 of the trunnion 6 can be reduced further. By the way, in the present embodiment, in order to closely contact together the trunnion 6 and the contact surfaces 33c of the connecting member 33, bolts 50 may be respectively inserted into the areas of the contact surfaces 33c from the thrust direction too thereby fasten the trunnion 6 and connecting member 33 to each other.

Figure 3:
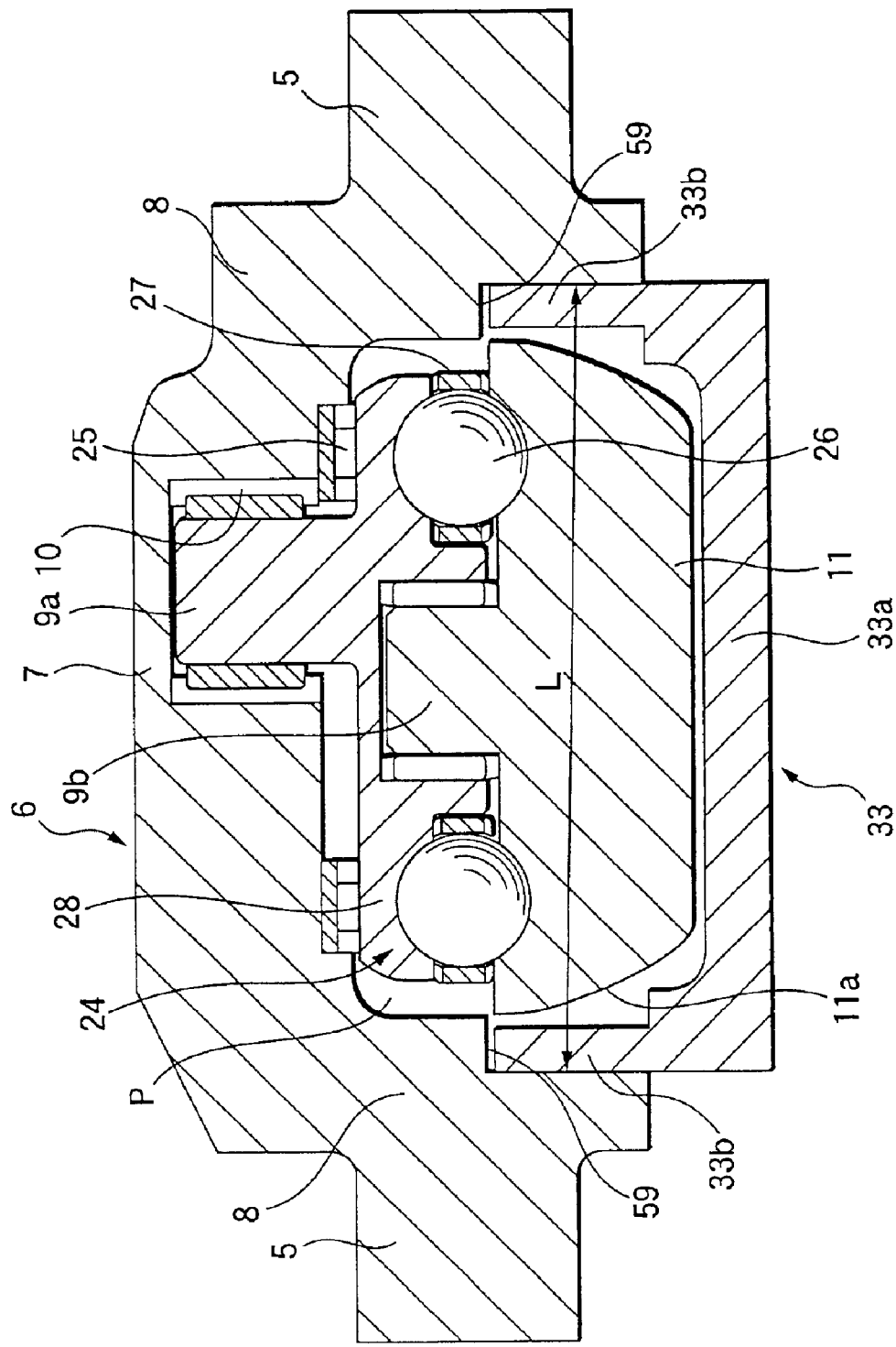
FIG. 3 is an enlarged section view of a portion of a toroidal-type continuously variable transmission according to a third embodiment of the invention, corresponding to the portion shown in FIG. 1.

Now, FIG. 3 shows a third embodiment of a toroidal-type continuously variable transmission according to the invention. By the way, the present embodiment is also a modification of the first embodiment. Therefore, the component parts thereof used in common with the first embodiment are given the same designations and thus the description thereof is omitted here.

As shown in FIG. 3, in the present embodiment, between the pressure receive portions 33b of the connecting member 33 and a pocket portion P (a recess-shaped hole), there is formed interference. That is, the inside diameter L of the pocket portion P is set smaller than the outside diameter of the pressure receive portion 33b. Therefore, the pressure receive portions 33b are elastically deformed toward the longitudinal-direction inside of the connecting member 33 and is pressure inserted into the pocket portion P with interference fit.

According to the present structure, even in case where a large thrust load acts on the trunnion 6, the bending deformation of the trunnion 6 can be relieved and thus stresses in the connecting portions A can be reduced. Also, the interference fit can prevent the connecting member 33 from being removed from the trunnion 6 in the thrust direction. Therefore, there is eliminated the need for use of the thrust-direction bolts 50 as shown in FIG. 2, which can enhance the reliability of the trunnion.

By the way, alternatively, the interference fit may also be provided by inclining the pressure receive portions 33b inwardly in the longitudinal direction of the connecting member 33.

Figure 4:
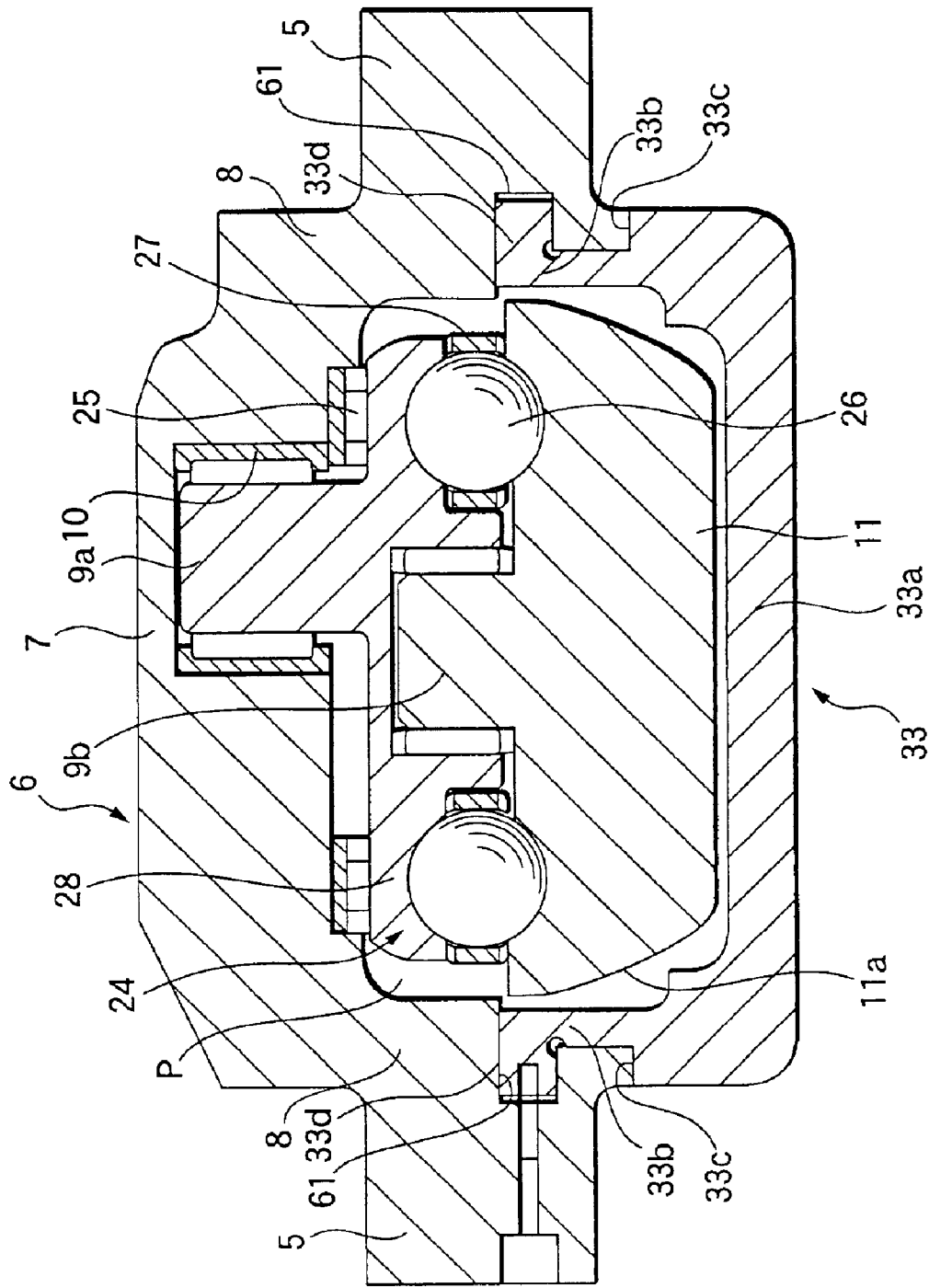
FIG. 4 is an enlarged section view of a portion of a toroidal-type continuously variable transmission according to a fourth embodiment of the invention, corresponding to the portion shown in FIG. 1.

Now, FIG. 4 shows a fourth embodiment of a toroidal-type continuously variable transmission according to the invention. By the way, the present embodiment is a modification of the second embodiment. Therefore, the component parts thereof used in common with the second embodiment are given the same designations and thus the description thereof is omitted here.

As shown in FIG. 4, in a connecting member 33 according to the present embodiment, in the end portions of the pressure receive portions 33b, there are formed projecting portions 33d which extend in a direction intersecting at right angles to the thrust direction (a direction going outwardly in the diameter direction of the connecting member 33). And, the projecting portions 33d can be respectively inserted into their associated holes 61 which are formed in the trunnion 6 so as to extend in the axial direction of their associated pivot shafts 5.

Figure 5:
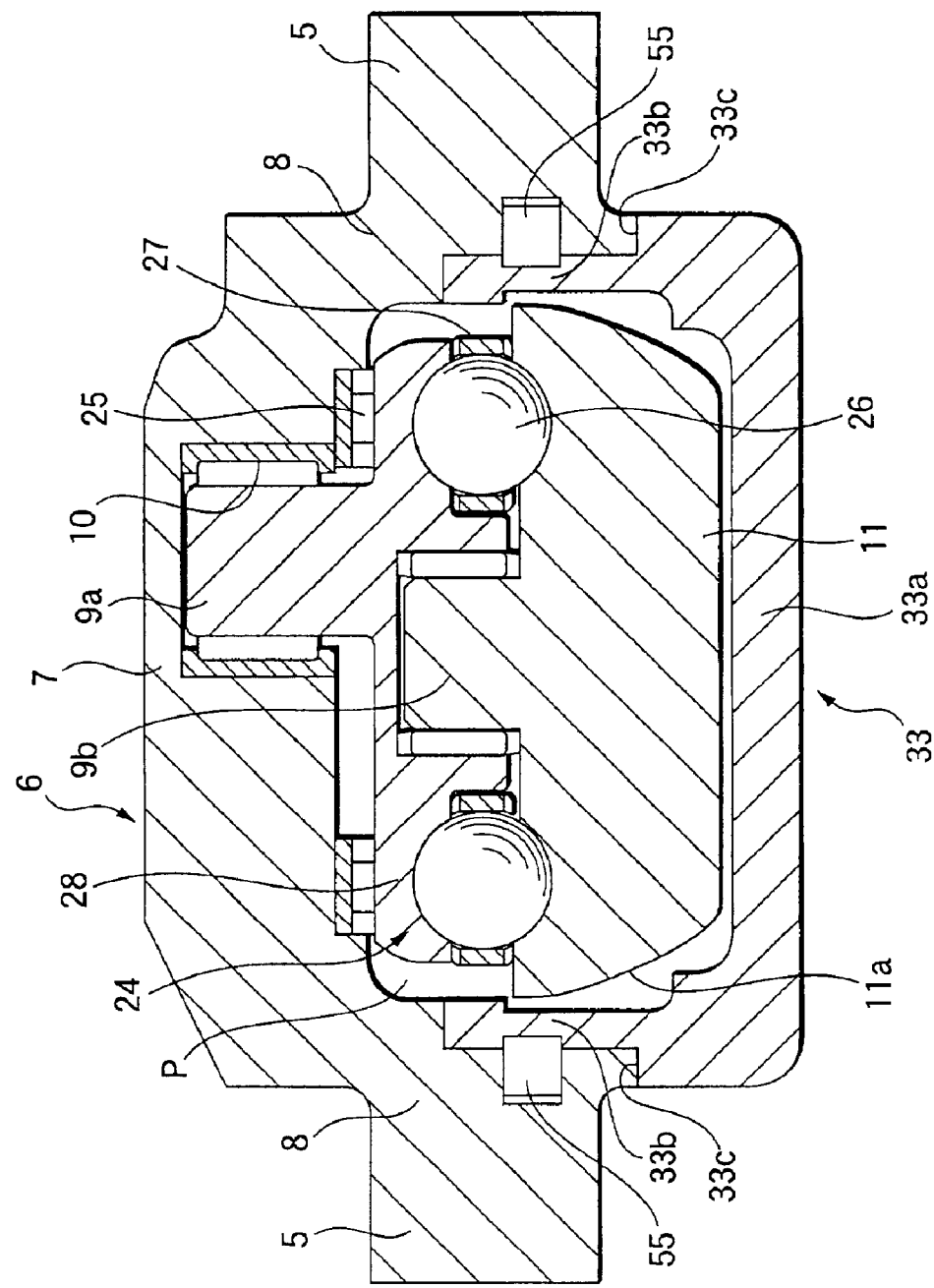
FIG. 5 is an enlarged section view of a modification of the fourth embodiment shown in FIG. 4.

According to this structure, the mutual engagement between the projecting portions 33d and holes 61 can prevent the connecting member 33 from being removed from the trunnion 6 in the thrust direction. Therefore, there is eliminated the need for use of the thrust-direction bolts 50 as shown in FIG. 2, which can enhance the reliability of the trunnion. By the way, as means for preventing the connecting member 33 from being removed from the trunnion 6 in the thrust direction, there is also available another means: for example, as shown in FIG. 5, key grooves may be formed in the given portions of the pressure receive portions 33b of the connecting member 33 and also in the portions of the trunnion 6 which are opposed to the given portions of the pressure receive portions 33b, and keys 55 maybe respectively inserted into their associated key grooves to thereby restrict the movement of the connecting member 33 in the thrust direction.

Figure 6:
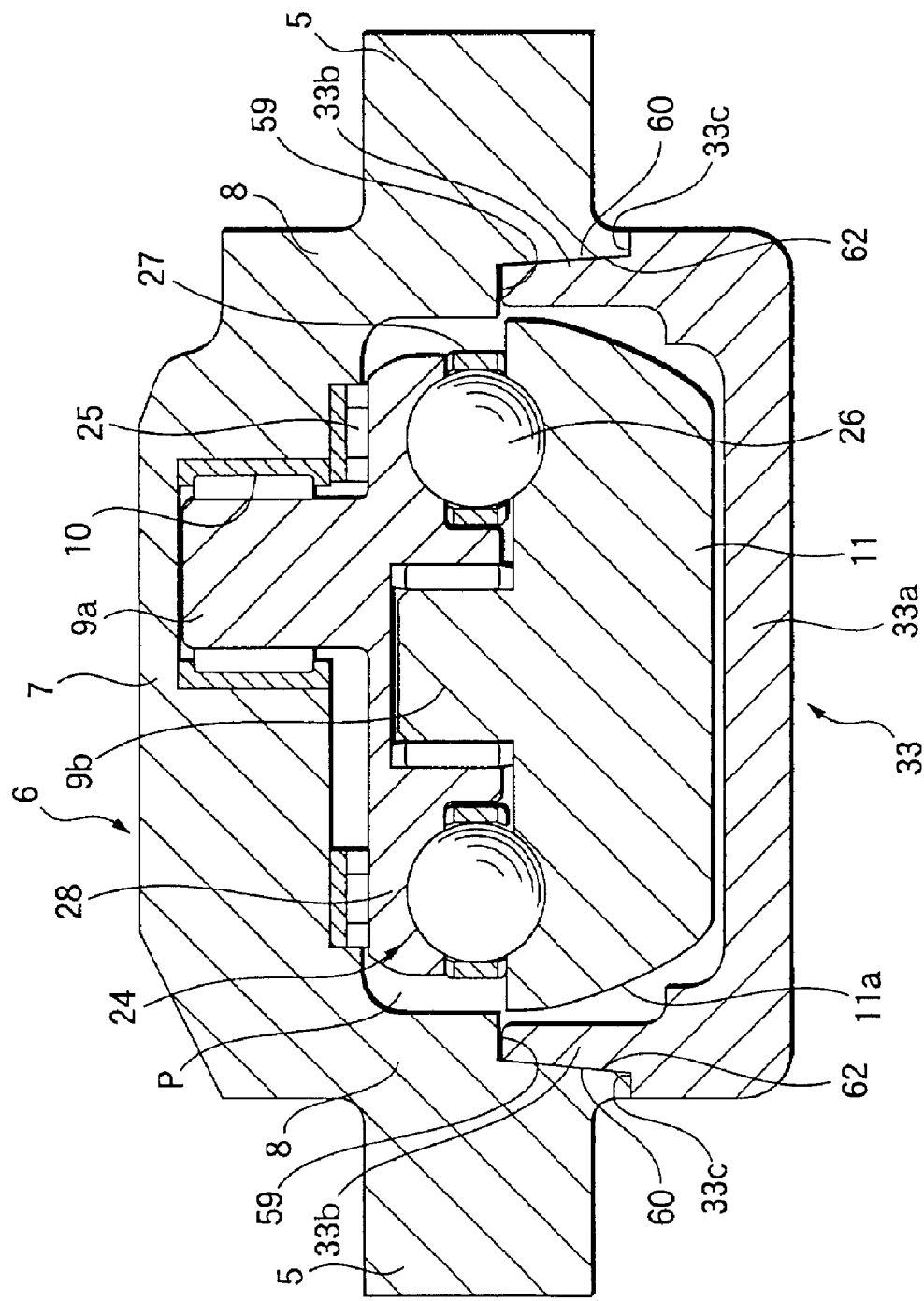
FIG. 6 is an enlarged section view of a portion of a toroidal-type continuously variable transmission according to a fifth embodiment of the invention, corresponding to the portion shown in FIG. 1.

Now, FIG. 6 shows a fifth embodiment of a toroidal-type continuously variable transmission according to the invention. By the way, the present embodiment is also a modification of the second embodiment. Therefore, the component parts thereof used in common with the second embodiment are given the same designations and thus the description thereof is omitted here.

In the present embodiment, the connecting surfaces between the pressure receive portions 33b of the connecting member 33 and trunnion 6 are inclined at a given angle to the thrust direction. Specifically, not only the connecting surfaces 60 of the pressure receive portions 33b to be contacted with trunnion 6 are inclined inwardly in the longitudinal direction of the connecting member 33 but also the connecting surfaces 62 of the trunnion 6 to be contacted with the pressure receive portions 33b are also inclined in the same direction.

Figure 7:
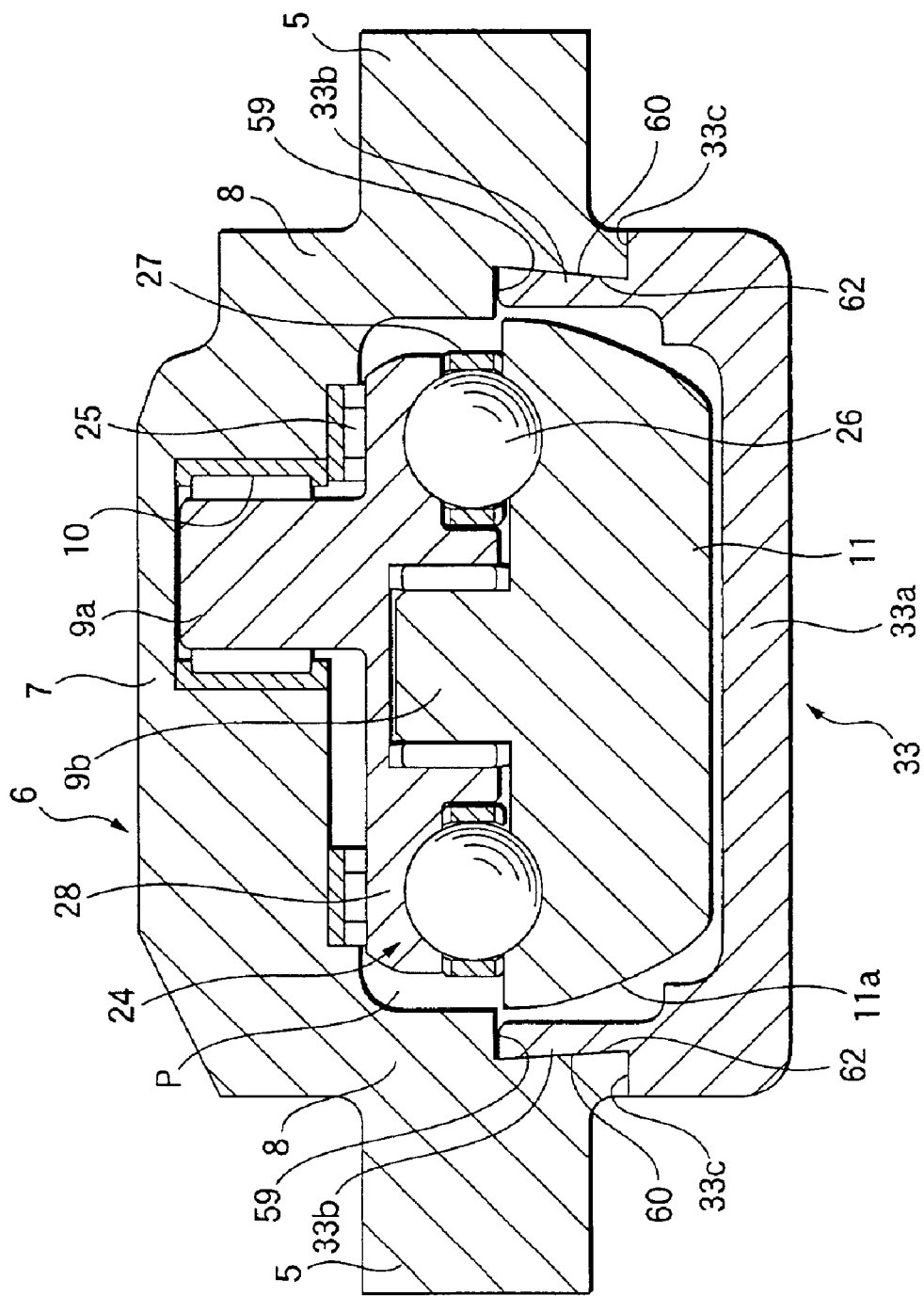
FIG. 7 is an enlarged section view of a modification of the fifth embodiment shown in FIG. 6.

According to this structure, when the trunnion 6 is deformed, the inclined surfaces (connecting surfaces) 60, 62 bite into each other like wedges to thereby be able to restrict the deformation of the trunnion 6 still further. Also, the mutual wedge-like biting of the inclined surfaces 60, 62 can prevent the connecting member 33 from being removed from the trunnion 6 in the thrust direction. Here, alternatively, the inclining direction of the inclined surfaces 60, 62 shown in FIG. 6 may be reversed as shown in FIG. 7.

By the way, the invention is not limited to the respective embodiments described above but, of course, various modifications and changes are also possible without departing from the gist of the invention. For example, in the above illustrated embodiments, the invention is applied to a structure in which the circular hole 10 of the trunnion 6 that an excessive stress can be applied to is formed in a bag shape; however, the invention can also be applied to the conventional structure in which the circular hole 10 is formed so as to penetrate through the support plate portion of the trunnion. Also, in the above illustrated embodiments, the invention is applied to a structure the inner and outer races of the power roller 11 are supported through bearings; however, the invention can also be applied to the conventional structure in which the inner and outer races are both supported by their associated pivot shafts.

As has been described heretofore, according to the invention, the pocket portion crushing force can be received in the crushing direction directly by the pressure receive portions of the connecting member to be contacted with the inner surfaces of the pocket portion. This not only can prevent the elastic deformation of the trunnion effectively but also can reduce stresses acting on the connecting portions between the pivot shafts and support plate portion of the trunnion.

Also, according to the invention, since the contact surface can restrict the trunnion from falling down in the thrust direction, the stresses acting on the connecting portions between the pivot shafts and support plate portion of the trunnion can be reduced further.

Further, according to the invention, because the pressure receive portions of the connecting member are pressure inserted into the pocket portion with interference fit, the bending deformation of the trunnion can be relieved. Also, such interference fit can prevent the connecting member from being removed from the trunnion in the thrust direction.

Moreover, according to the invention, the connecting member can be firmly fixed to the trunnion.

In addition, according to the invention, since, when the trunnion is deformed, the inclined surfaces bite their respective mating members like wedges, the deformation of the trunnion can be restricted further. Also, the wedge-like biting of the inclined surfaces can prevent the connecting member from being removed from the trunnion in the thrust direction.

Now, description will be given below of the sixth and seventh embodiments of a toroidal-type continuously variable transmission according to the invention with reference to the accompanying drawings. By the way, the invention is characterized by a connecting structure for connecting together a trunnion 6 and a connecting member 33 which is used to prevent the elastic deformation of the trunnion 6 which can be caused by a thrust load applied thereto; and, the remaining structures and operations of the invention are similar to those of the previously described conventional toroidal-type continuously variable transmission. Therefore, from now on, description will be given only of the characteristic portions of the invention, while the remaining portions of the invention are given the same designations as shown in FIGS. 19 to 24 and thus the description thereof is simplified here.

Figure 8:
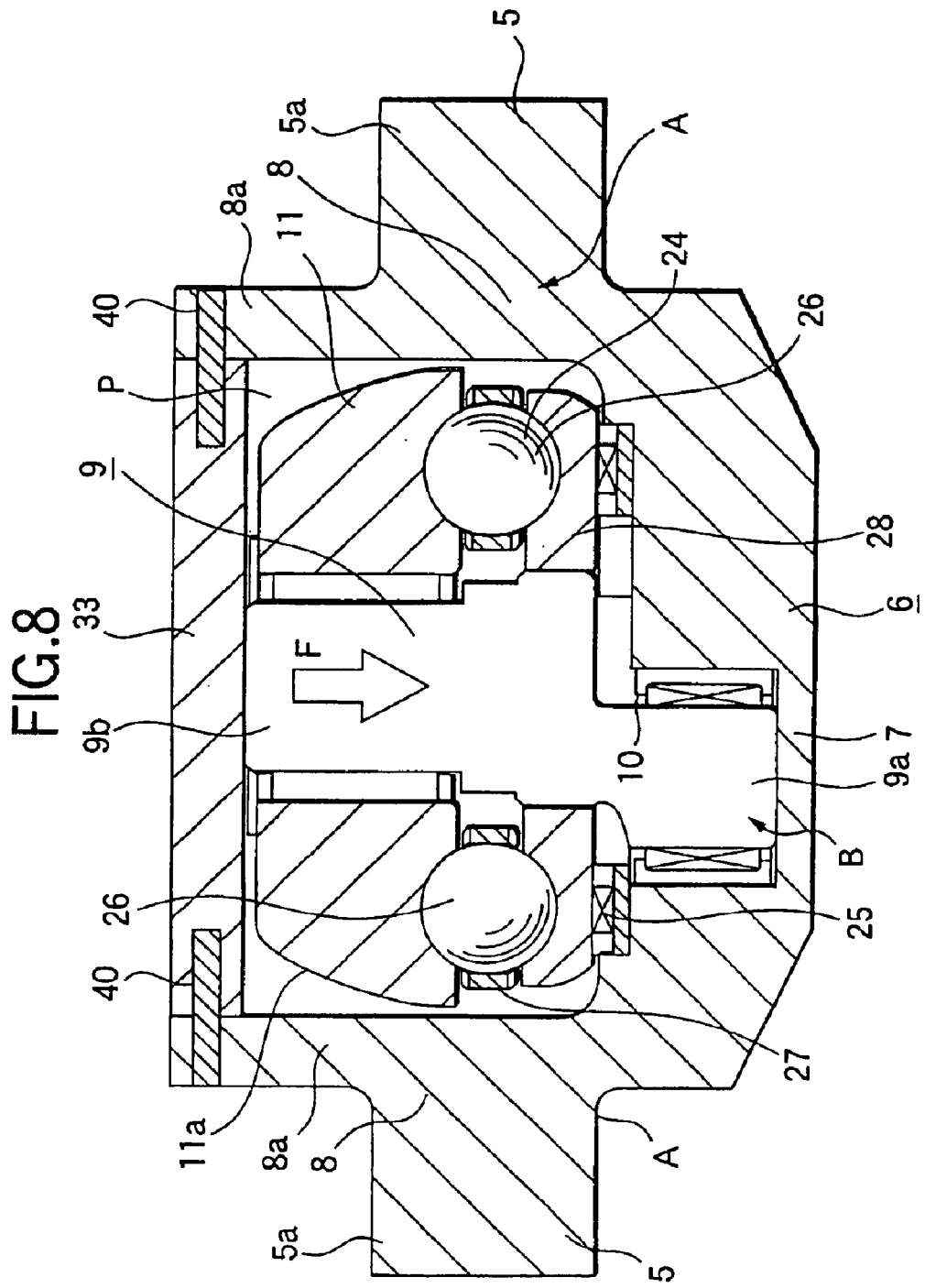
FIG. 8 is an enlarged section view of a trunnion used in a toroidal-type continuously variable transmission according to a sixth embodiment of the invention, corresponding to a trunnion disposed on the lower side in FIG. 23.

Now, FIG. 8 shows a sixth embodiment of a toroidal-type continuously variable transmission according to the invention. As shown in FIG. 8, a trunnion 6 constituting a toroidal-type continuously variable transmission according to the present embodiment, similarly to the trunnion 6 used in the previously described conventional toroidal-type continuously variable transmission, includes, on the two end portions thereof in the longitudinal direction (in FIG. 8, in the right and left direction) of the support plate portion 7, a pair of bent wall portions 8, 8 which are formed so as to be bent toward the inner surface side (in FIG. 8, the upper side) of the support plate portion 7. And, on the outer surfaces of the bent wall portions 8, 8, there are disposed pivot shafts 5, 5 in such a manner that they are concentric with each other.

The trunnion 6 has hardness of $H_RC45$ or lower through heat treatment for refining. Also, the transfer surface portions 5a of a radial needle roller bearing 32 for supporting the inclined rotation of the trunnion have surface hardness of $H_RC50$ or higher through heat treatment such as through hardening, high-frequency induction hardening and carburizing, in order to prevent the transfer surface portions 5a from being worn due to its contact with the radial needle roller bearing 32.

By the way, a circular hole 10, which is formed in the central portion of the support plate portion 7 for supporting the base end portion 9a of the displacement shaft 9, does not penetrate through the support plate portion 7 but one end side (the opposite side to the pocket portion P where the power roller 11 is to be stored) of the circular hole 10 is closed; that is, the circular hole 10 is formed as a bag with one side thereof closed.

Also, in the case of the trunnion 6 according to the present embodiment, on the inner surface side (pocket portion P side) of the trunnion 6 where the power roller 11 is situated, there is disposed a connecting member 33 which restricts the inner surface side of the trunnion 6 from being elastically deformed in a direction where the inner surface side of the trunnion 6 can be turned into a concave surface. The connecting member 33 extends in such a manner that it spreads between and over the leading end portions 8a, 8a of a pair of bent wall portions 8, 8. Specifically, the connecting member 33 is situated within the pocket portion P and can be contacted with the inner surface of the pocket portion P in a direction intersecting the thrust direction substantially at right angles to thereby receive a pressing force which acts on the pocket portion P so as to crush the pocket portion P. By the way, the connecting member 33 is formed in a linear shape by enforcing a working operation, which can obtain large rigidity, such as a forging operation on base material having sufficient rigidity such as steel.

In the case of the present connecting member 33, after the displacement shaft 9, power roller 11, thrust ball bearing 24 and thrust needle roller bearing 25 are assembled to the trunnion 6, the connecting member 33 is connected to and fixed to the trunnion 6 by a fastening member 40 such as a pin.

Figure 9:
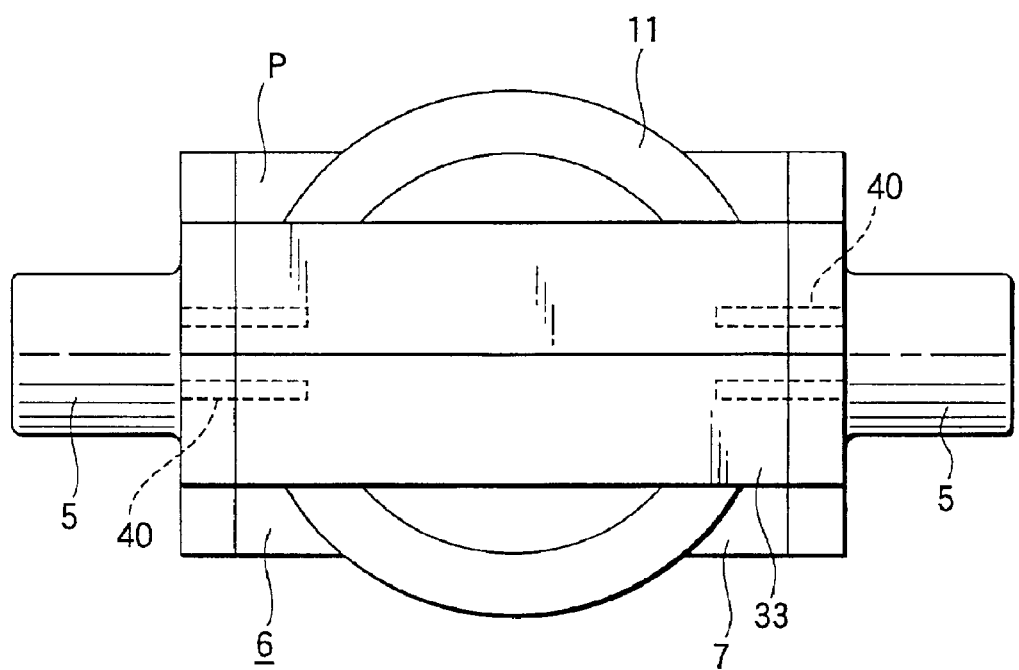
FIG. 9 is a top plan view of the trunnion shown in FIG. 8.

In a state where the connecting member 33 is connected to and fixed to the trunnion 6 through the fastening member 40, the power roller 11 is interposed between the connecting member 33 and the support plate portion 7 of the trunnion 6. However, the portions of the power roller 11, which are to be contacted with the inner surfaces 2a, 4a of the input side and output side disks 2, 4 (see FIGS. 19, 20 and 22), as shown in FIG. 9, are exposed from the side edge of the connecting member 33 (the side opening of the pocket portion P). In order that the portion of the peripheral surface 11a of the power roller 11 exposed from the side edge of the connecting member 33 can be contacted with the inner surfaces 2a, 4a of the input side and output side disks 2, 4, the shape and size of the connecting member 33 may be set in such a manner that the connecting member 33 can be prevented from interfering with the input side and output side disks 2, 4 regardless of the swing motion of the trunnion 6.

According to the present structure, since the trunnion 6 and connecting member 33 are produced as separate members, they are easy to work; and, because the connecting member 33 and trunnion 6 are connected together through the fastening member 40, the connecting member 33 can be prevented from slipping out of the trunnion 6.

Also, since the pair of bent wall portions 8, 8, which are respectively disposed on the two end portions of the trunnion 6 in the longitudinal direction thereof, are connected to each other by the connecting member 33, the bending rigidity of the trunnion 6 can be enhanced. For this reason, even in case where a thrust load F going downward in FIG. 8 is applied to the inner surface of the support plate portion 7 constituting the present trunnion 6 due to operation of the toroidal-type continuously variable transmission, the trunnion 6 is hard to be elastically deformed. Especially, because the connecting member 33 according to the present embodiment can be contacted with the inner surfaces of the pocket portion P (specifically, the inner surfaces of the bent wall portions 8, 8) to thereby be able to receive directly the pocket portion P crushing force in the crushing direction, the elastic deformation of the trunnion 6 can be prevented effectively. In case where the pocket portion P crushing force can be received and supported in the crushing direction effectively in this manner, the restricting-force of the connecting member 33 for restricting the elastic deformation of the trunnion 6 is able to act effectively in a direction to resist the pocket portion P crushing force. Accordingly, variations in the clearance between the leading edges of the pair of bent wall portions 8, 8 can be restricted, which makes it possible to prevent the elastic deformation of the trunnion 6 effectively.

Also, in case where the elastic deformation of the trunnion 6 can be prevented in this manner, even when excessive torque is input, stresses are prevented from concentrating on the connecting portions A between the pivot shafts 5, 5 and support plate portion 7 (stresses can be reduced); and, therefore, even in case where the thickness of the trunnion 6 is not increased specially, damage such as a crack is hard to occur in the base end portions of the respective pivot shafts 5, 5. This not only can reduce the weight and cost of the trunnion but also can reduce the size of the trunnion. Also, since the inclination of the displacement shaft 9 caused by the deformation of the trunnion 6 can be prevented to thereby restrict the position of the power roller 11 supported on the leading end portion 9b of the displacement shaft 9 from shifting, the transmission operation of the toroidal-type continuously variable transmission can be stabilized. By the way, in the present embodiment, since the circular hole 10 of the central portion of the support plate portion 7 supporting the base end portion 9a of the displacement shaft 9 is formed in a bag shape which does not penetrate through the support plate portion 7 but one end side of the circular hole 10 is closed, even in case where the displacement shaft 9 is inclined with respect to the trunnion 6, there can be avoided a fear that stresses can concentrate on the engaging portion B between the base end portion 9a of the displacement shaft 9 and trunnion 6 to thereby cause damage such as cracks in the engaging portion B.

Now, FIG. 10A shows a first modification 1 of the sixth embodiment of a toroidal-type continuously variable transmission according to the invention. By the way, in the present modification, the component parts thereof used in common with the structure shown in FIG. 8 are given the same designations and thus the description thereof is simplified.

As shown in FIG. 10A, in the leading end portion 8a of one of a pair of bent wall portions 8 of the trunnion 6, there is formed a pin hole 44 into which there can be inserted a pin 40 used to connect together the trunnion 6 and connecting member 33. The inside diameter of the pin hole 44 is set slightly larger than the outside diameter of the pin 40. Also, in one end portion of the connecting member 33, there is formed a pin hole 42 into which the pin 40 can be inserted. The inside diameter of the pin hole 42 is substantially coincident with the outside diameter of the pin 40.

The pin 40 is fixed within the pin hole 42, for example, by caulking (the caulked and fixed portion of the pin 40 is shown by reference character 45 in FIG. 10A). Also, within the pin hole 44 having an inside diameter larger than the outside diameter of the pin 40, the pin 40 is disposed in a clearance fit state having a given clearance S1 between itself and the inner surface of the pin hole 44, so that the pin 40 allows the trunnion 6 to move in the axial direction thereof (which is shown by an arrow mark in FIG. 10A).

By the way, also between the leading end portion 8a of the other bent wall portion 8 of the trunnion 6 and the other end portion of the connecting member 33, preferably, there may be disposed a similar connecting structure; however, such connecting structure may not be disposed. That is, it is possible to employ an arbitrary connecting structure such as the connecting structure shown in FIG. 8, a connecting structure shown in FIG. 11 (which will be discussed later), or an integratedly molded structure.

As described above, in the present modification 1, since there is employed the structure which is similar to the structure shown in FIG. 8, there can be obtained a similar operation effect to FIG. 8. And, at the same time, the pin 40, which is a fastening member, instead of being fixed to both of the trunnion 6 and connecting member 33, is fixed only to the connecting member 33 (only one end portion of the pin 40 is fixed to the connecting member 33) to thereby allow the axial-direction movement of the trunnion 6 (that is, allow the connecting member 33 and bent wall portion 8a to move with respect to each other along the axial direction of the pin 40); and, therefore, even in case where there exists a clearance between the trunnion 6 and connecting member 33, there is no possibility that the load can be transmitted by the pin 40 itself.

Figure 11:
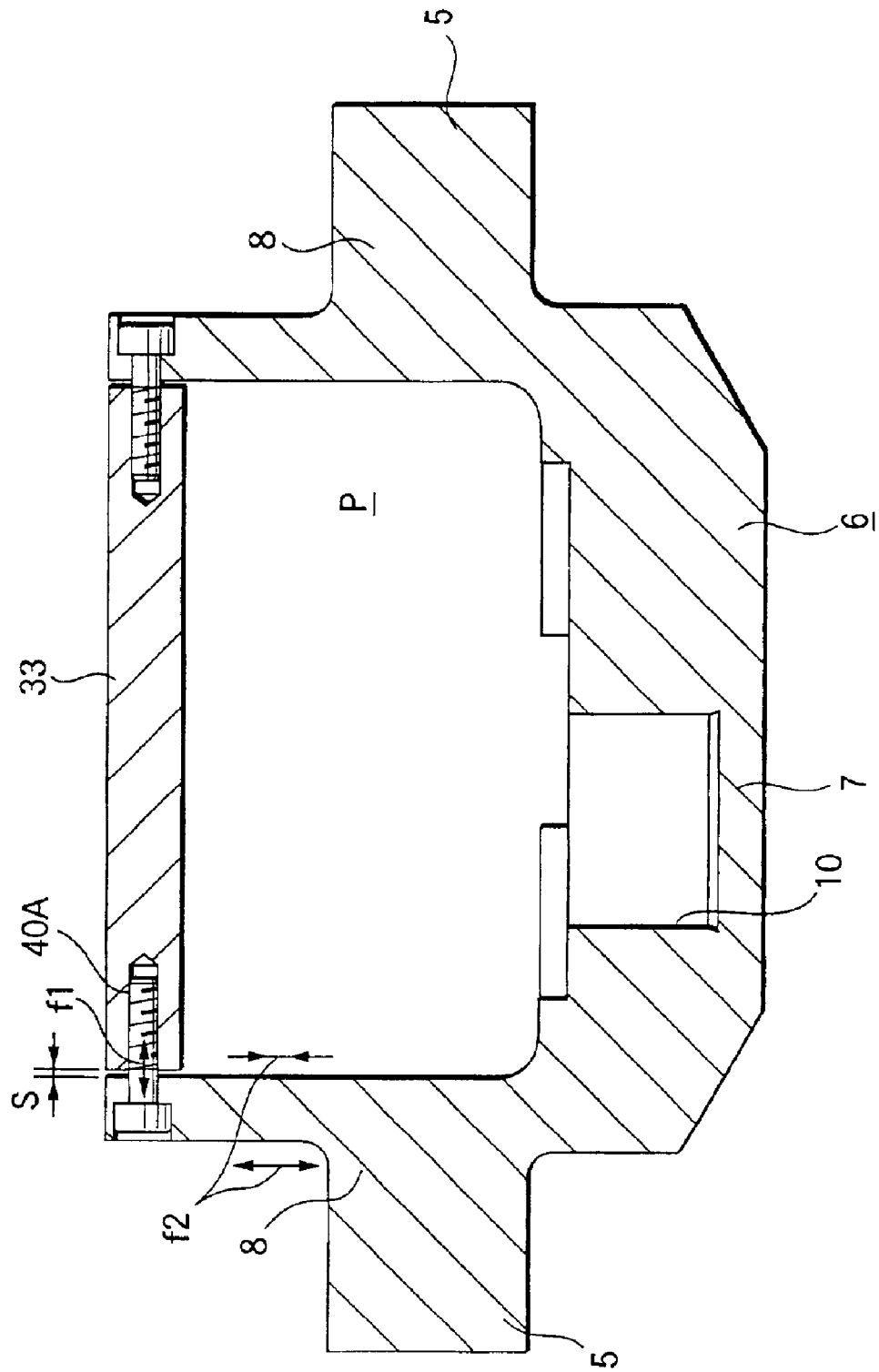
FIG. 11 is an enlarged section view of a trunnion and a connecting member, corresponding to FIG. 8;.
Figure 12:
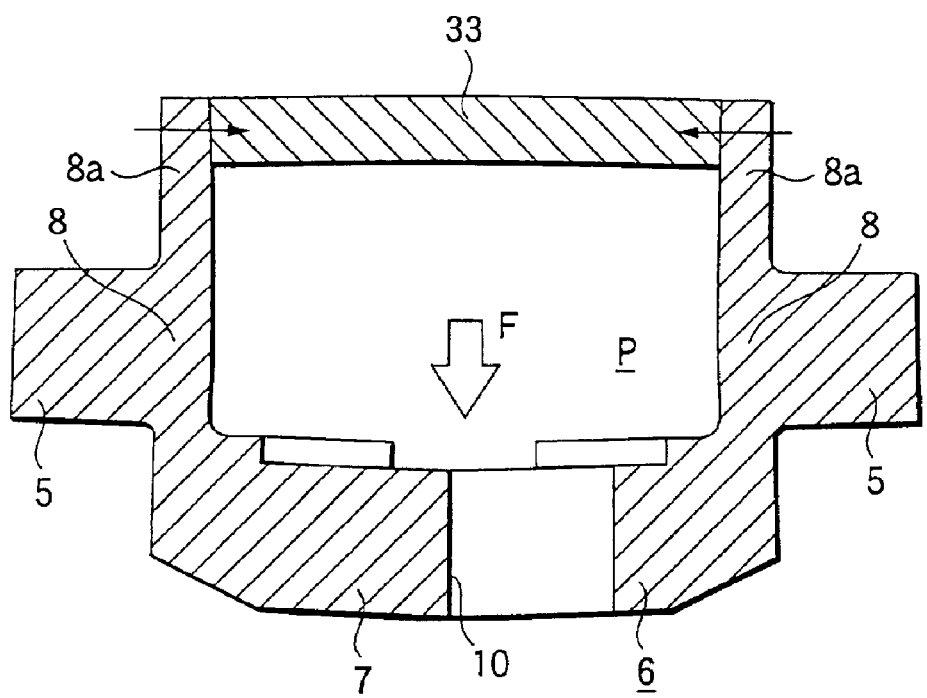
FIG. 12 is a section view of a specific shape of a trunnion (with a connecting member), showing a state in which the trunnion is elastically deformed due to a thrust load.
Figure 13:
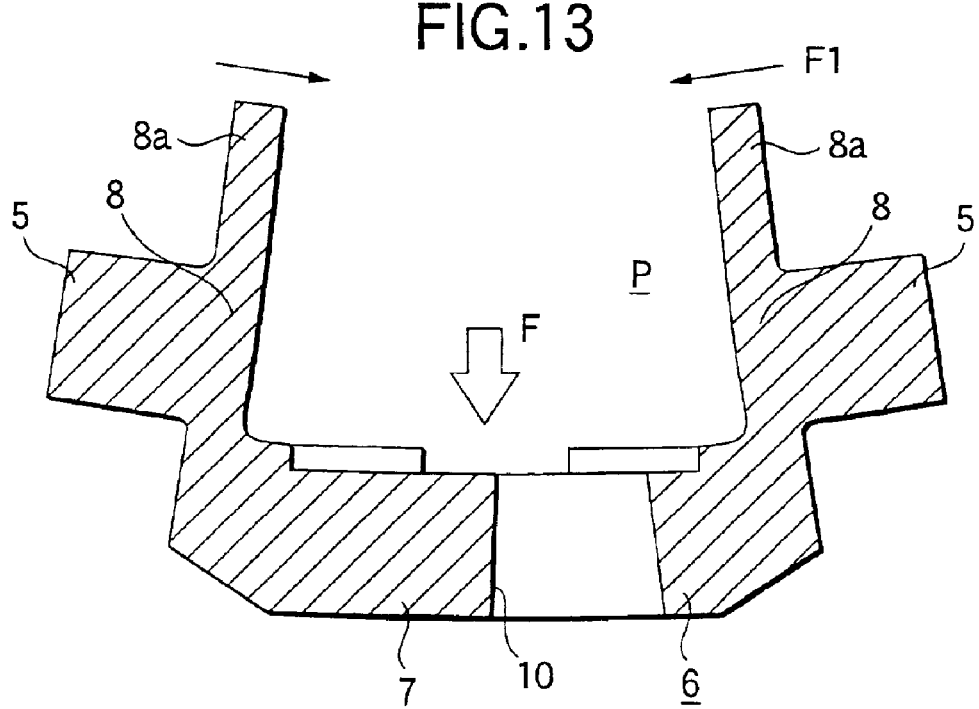
FIG. 13 is a section view of a specific shape of a trunnion, showing a state in which it is elastically deformed due to a thrust load.

Here, as shown in FIG. 11, in case where the trunnion 6 and connecting member 33 are fastened together by a bolt 40A with a given clearance S formed between them, as shown in FIGS. 12 and 13, when a thrust load F is applied to the trunnion 6, the trunnion 6, due to its structure, is deformed in a direction to compress the connecting member 33 (a compression force F1 is applied). For this reason, in case where both of the trunnion 6 and connecting member 33 are screwed, due to the existence of the clearance S between the trunnion 6 and connecting member 33, the load is transmitted by the bolt 40A itself.

Also, in case where a bolt hole on the trunnion 6 side is formed as a through hole, when the thrust load F acts on the trunnion 6, the load is not transmitted to the connecting member 33 by the bolt 40A itself; but, in case where the bolt 40A is tightened when assembling the trunnion and connecting member, a bending load (stress) f2 is applied to the trunnion 6 according to the amount of the clearance S. Also, due to this, a tensile load (stress) f1 is applied to the bolt 40A.

In case where the trunnion 6 and connecting member 33 are perfectly connected together by a fastening member such as the bolt 40A in the above-mentioned manner, an unreasonable load is applied to the fastening member and its peripheral portion, which makes it impossible for the connecting member 33 to fulfill its original function sufficiently.

On the other hand, according to the present modification, since the trunnion 6 and connecting member 33 are not perfectly closely connected together by the pin 40 but there is employed a connecting structure in which there is formed a clearance between the pin 40 and trunnion 6 to thereby allow the movement of the trunnion, the pin 40 plays the role of a simple guide which transmits the power from the trunnion 6 to the connecting member 33, and thus the power from the trunnion 6 can be transmitted to the connecting member 33 smoothly without applying any unreasonable load to the pin 40 and its peripheral portion (without applying the bending load (stress) f2 to the trunnion 6, and without applying the tensile load (stress) f1 to the pin 40).

Therefore, the connecting member 33 is able to fulfill its original function sufficiently. Also, because the close connection between the trunnion 6 and connecting member 33 is not perfect close connection, they are easy to work, fit and assemble.

Now, FIG. 10B shows a second modification 2 of the sixth embodiment of a toroidal-type continuously variable transmission according to the invention. By the way, in the present modification, the component parts thereof used in common with the modification 1 shown in FIG. 10A are given the same designations and thus the description thereof is omitted.

As shown in FIG. 10B, in the leading end portion 8a of the bent wall portion 8 of the trunnion 6, there is formed a pin hole 44A into which there can be inserted a pin 40 used to connect together the trunnion 6 and connecting member 33. The inside diameter of the pin hole 44A is set substantially coincident with the outside diameter of the pin 40. Also, in the end portion of the connecting member 33, there is formed a pin hole 42A into which the pin 40 can be inserted. The inside diameter of the pin hole 42A is set slightly larger than the outside diameter of the pin 40.

The pin 40 is fixed within the pin hole 44A, for example, by caulking (the caulked and fixed portion of the pin 40 is shown by reference character 46 in FIG. 10B). Also, the pin 40, within the pin hole 42A having an inside diameter larger than the outside diameter of the pin 40, is disposed in a clearance fit state having a given clearance S2 between itself and the inner surface of the pin hole 42A, so that the connecting member 33 is allowed to move in the axial direction thereof (which is shown by an arrow mark in FIG. 10B).

As described above, in the present modification as well, since the pin 40 is fixed only to the trunnion 6 and the connecting member 33 is thereby allowed to move in the axial direction thereof, there can be obtained a similar operation effect to the sixth embodiment.

Now, FIG. 14A shows a third modification 3 of the sixth embodiment of a toroidal-type continuously variable transmission according to the invention. By the way, in the present modification, the component parts thereof used in common with the modification 1 shown in FIG. 10A are given the same designations and thus the description thereof is omitted.

As shown in FIG. 14A, in the leading end portion 8a of the bent wall portion 8 of the trunnion 6, there is formed a screw hole 44A into which there can be threadedly engaged a bolt 40A used to connect together the trunnion 6 and connecting member 33. Also, in the end portion of the connecting member 33, there is formed a hole 42 into which the bolt 40A can be inserted. The inside diameter of the hole 42 is set slightly larger than the outside diameter of the bolt 40A.

In this structure, the bolt 40A is fixed in such a manner that it is threadedly engaged into the screw hole 44A. Also, the bolt 40A, within the hole 42 having an inside diameter larger than the outside diameter of the bolt 40A, is disposed in a clearance fit state with a given clearance S2 existing between itself and the inner surface of the hole 42, so that the connecting member 33 is allowed to move in the axial direction thereof shown by an arrow mark in FIG. 14A.

As described above, in the present modification as well, since the bolt 40A is fixed only to the trunnion 6 and the connecting member 33 is thereby allowed to move in the axial direction thereof, there can be obtained a similar operation effect to the first and second modifications 1 and 2.

Now, FIG. 14B shows a fourth modification 4 of the sixth embodiment of a toroidal-type continuously variable transmission according to the invention. By the way, in the present modification, the component parts thereof used in common with the modification 3 shown in FIG. 14A are given the same designations and thus the description thereof is omitted.

As shown in FIG. 14B, in the leading end portion 8a of the bent wall portion 8 of the trunnion 6, there is formed a hole 44 into which there can be inserted a bolt 40A used to connect together the trunnion 6 and connecting member 33. The inside diameter of the hole 44 is set slightly larger than the outside diameter of the bolt 40A. Also, in the end portion of the connecting member 33, there is formed a screw hole 42A into which the bolt 40A can be inserted.

In this structure, the bolt 40A is fixed in such a manner that it is threadedly engaged into the screw hole 42A. Also, the bolt 40A, within the hole 44 having an inside diameter larger than the outside diameter of the bolt 40A, is disposed in a clearance fit state with a given clearance S1 existing between itself and the inner surface of the hole 44, so that the trunnion 6 is allowed to move in the axial direction thereof shown by an arrow mark in FIG. 14B.

As described above, in the present modification as well, since the bolt 40A is fixed only to the connecting member 33 and the trunnion 6 is thereby allowed to move in the axial direction thereof, there can be obtained a similar operation effect to the first to third modifications 1 to 3.

Figure 15:
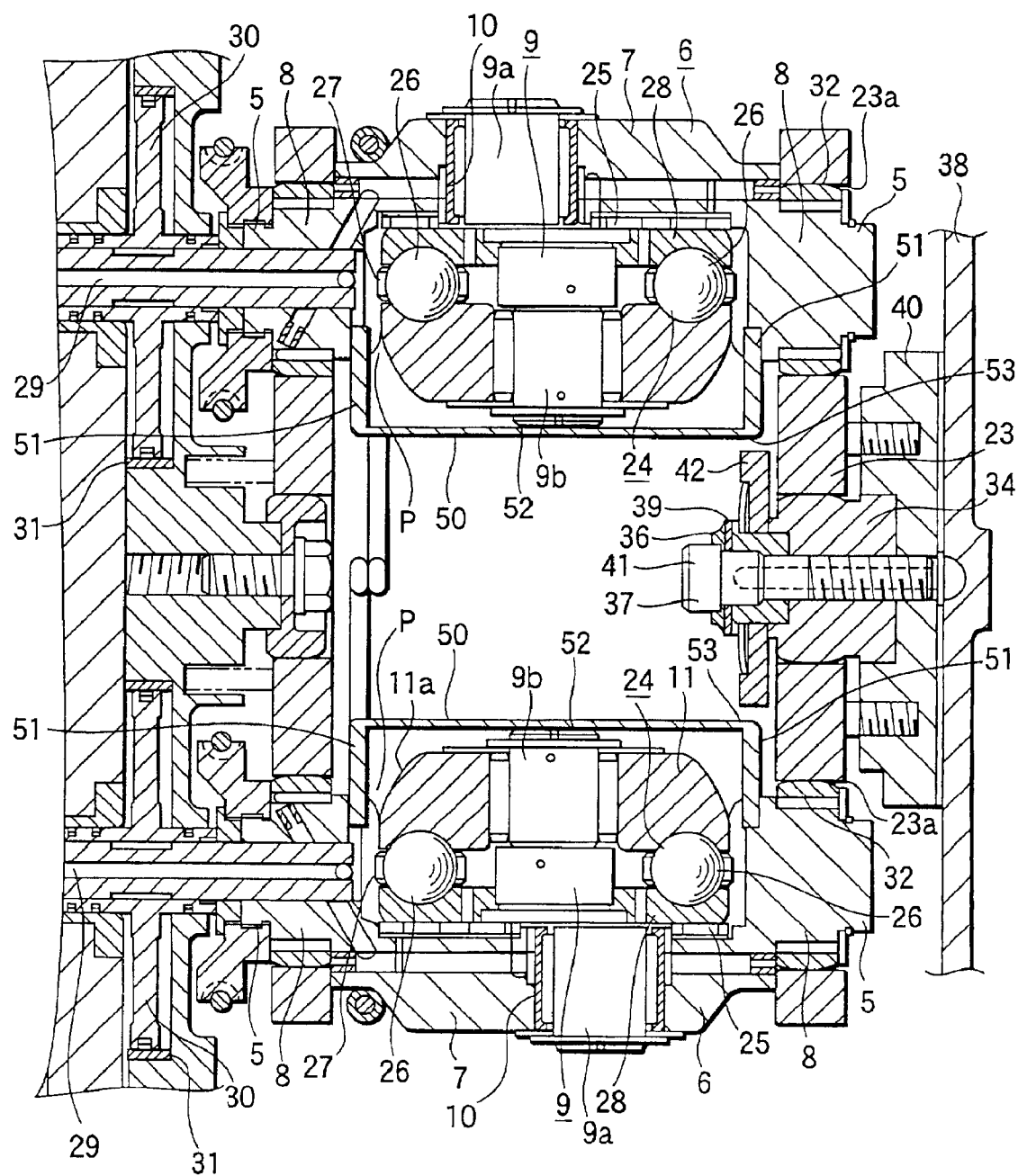
FIG. 15 is a section view of a toroidal-type continuously variable transmission according to a seventh embodiment of the invention.
Figure 16:
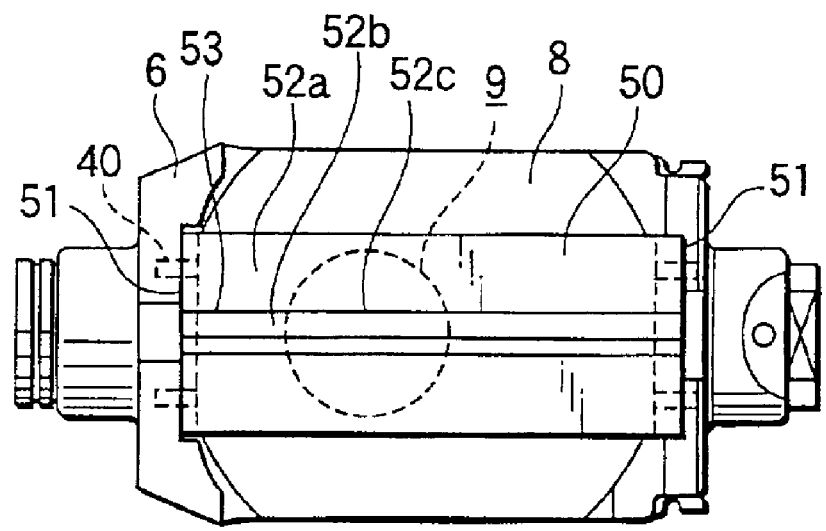
FIG. 16 is a top plan view of a trunnion disposed on the lower side in FIG. 15.
Figure 17:
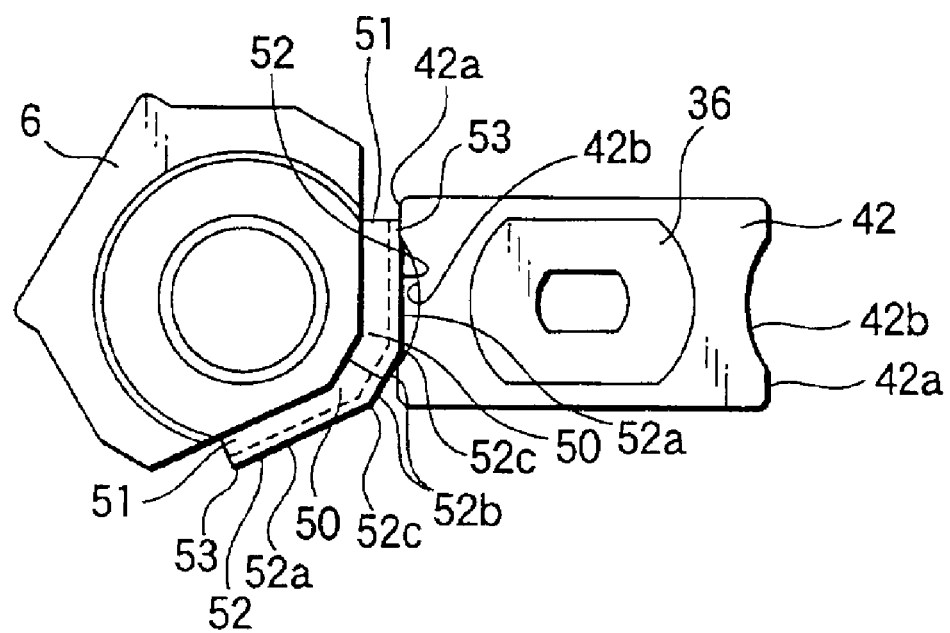
FIG. 17 is an explanatory view of a state in which the contact portions of a connecting member are contacted with a stopper.

Now, FIGS. 15 to 17 show a seventh embodiment of a toroidal-type continuously variable transmission according to the invention. As shown in FIG. 15, to the inner surface of a housing 38, there is fixed a support post 34 which is used to support the middle portions of support plates (yokes) 23 for supporting their respective trunnions 6 in such a manner that the present middle portions can be swung as well as can be shifted in the axial direction (in FIG. 15, in the right and left direction) of their associated pivot shafts 5, 5. And, a hold metal member 36 is connected and fixed by a connecting screw 37 to the central portion of the leading end portion of the support post 34 that is situated on the inner surface side of the support plates 23. In the leading end portion of the hold metal member 36, there is formed a flange-shaped hold portion 39 the outside diameter of which is larger than that of the near-to-base-end portion of the hold metal member 36.

Also, the connecting screw 37 penetrates through the support post 34 and hold metal member 36 and is threadedly engaged with a support plate 40 with its leading end portion fixed to the inner surface of the housing 38, while the head portion 41 of the connecting screw 37 is contacted with the hold portion 39. In this state, the support post 34 and hold metal member 36 are held by and between the support plate 40 and the head portion 41 of the connecting screw 37 and they are also fixed to the inner surface of the housing 38 through the support plate 40.

Also, between the lower end face of the support post 34 and hold portion 39, there is loosely held a stopper 42 which is used to prevent the swing motion of the trunnion 6 about the pivot shafts 5 from going beyond its allowed limit. This stopper 42, as shown in FIG. 17, has a substantially rectangular shape. In the two end portions of the stopper 42, there are formed a flat portion 42a and a substantially arc-shaped recessed portion 42b.

On the other hand, as shown in FIGS. 15 to 17, a connecting member 50 for use with the trunnion 6 is structured such that two side wall portions 51, 51 for receiving the pocket P crushing force in the crushing direction and two bottom wall portions, 52 are formed as an integral body to provide a substantially U-like shape as a whole. The two side wall portions 51, 51 respectively project out from the pair of bent wall portions 8, 8. Also, as shown in FIG. 17, the bottom wall portion 52 is structured such that a long portion 52a and a short portion 52b are formed as an integral body so as to have a given angle between them; and, a corner portion 52c formed by the long and short portions 52a and 52b can be inserted into the recessed portion 42b of the stopper 42.

Also, the connecting member 50 includes two connecting portions each for connecting together the side wall portion 51 and bottom wall portion 52. On end portion of each of the connecting portions, which is situated on the side wall portion 51 side of the long portion 52a of the bottom wall 52, provides a contact portion 53 which can be contacted with the stopper 42. That is, in case where the contact portions 53, 53 are butted against the flat portions 42a of the stopper 42, the trunnions 6, 6 are prevented against their respective inclined rotational movements. The contact portions 53, 53, similarly to the transfer surface portion 5a of the trunnion 6, have been heat-treated so as to be able to prevent themselves from being worn by the stopper 42.

By the way, the connecting member 50, similarly to the sixth embodiment, can be formed, for example, by enforcing a working operation such as a forging operation, which can provide large rigidity, on base material having sufficient rigidity such as steel. Also, the connecting member 50, as shown in FIG. 16, may be connected to and fixed to the trunnion 6 using a fastening member 40 such as a pin after the displacement shaft 9, power roller 11, thrust ball bearing 24 and thrust needle roller bearing 25 are assembled to the trunnion 6.

Figure 18:
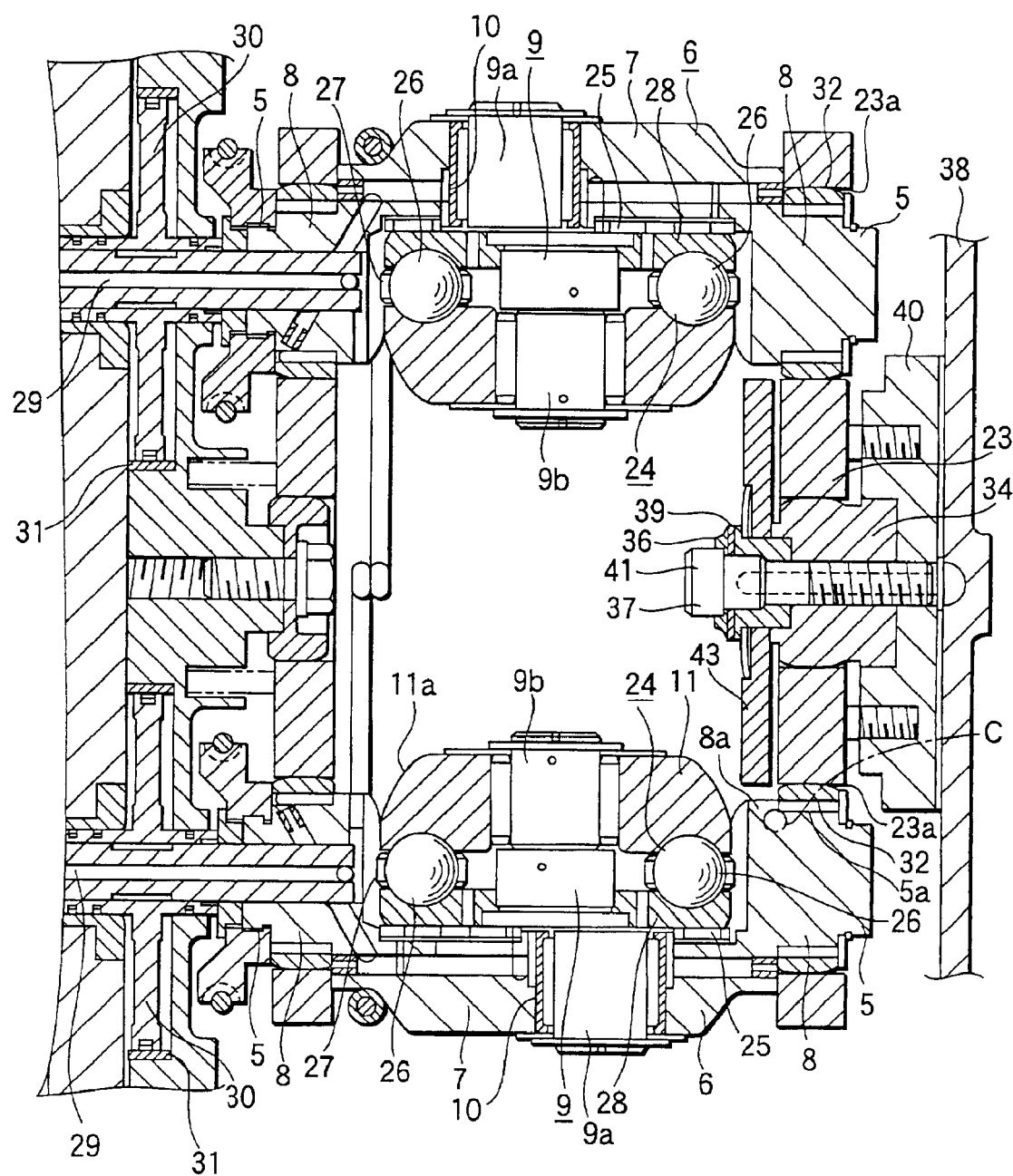
FIG. 18 is a section view of a trunnion and a stopper when a connecting member is not disposed.
Figure 19:
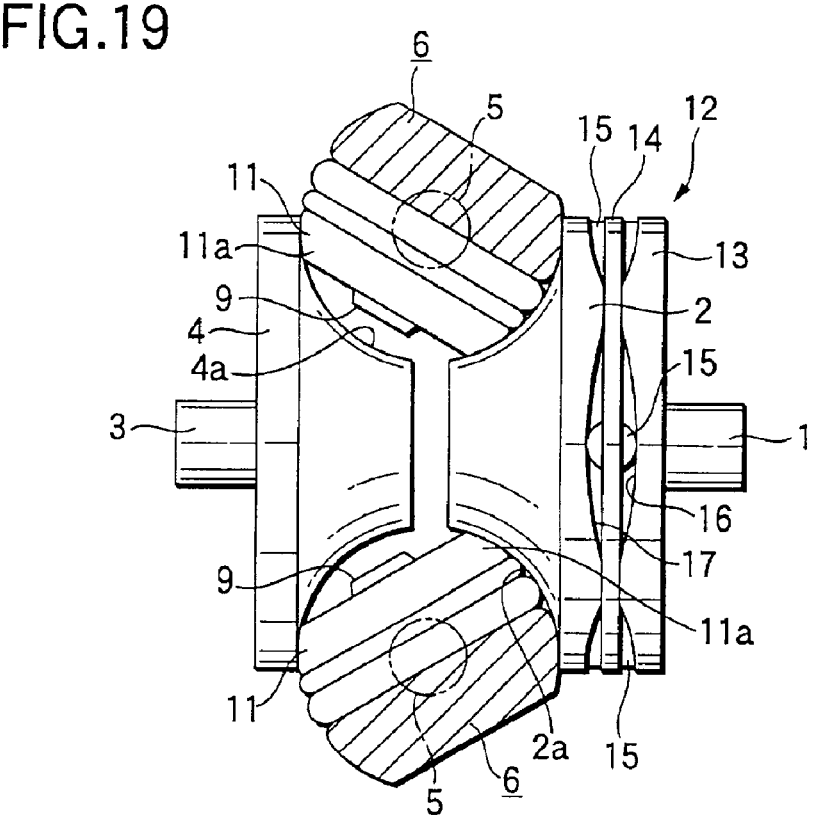
FIG. 19 is a side view of the basic structure of a conventional toroidal-type continuously variable transmission, showing a state in which a rotation speed is reduced down to the lower limit.
Figure 20:
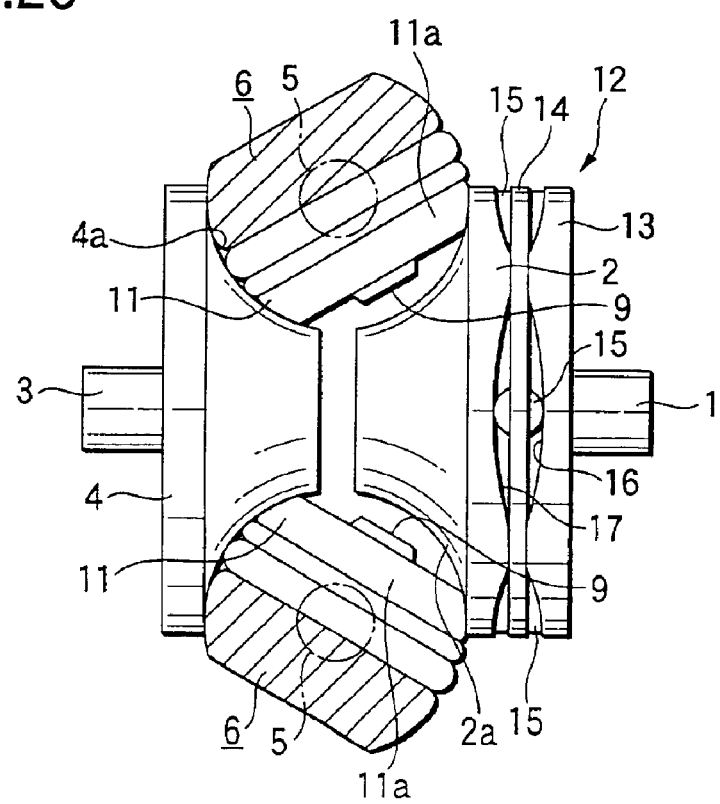
FIG. 20 is a side view of the basic structure of the conventional toroidal-type continuously variable transmission, showing a state in which the rotation speed is increased up to the upper limit.
Figure 21:
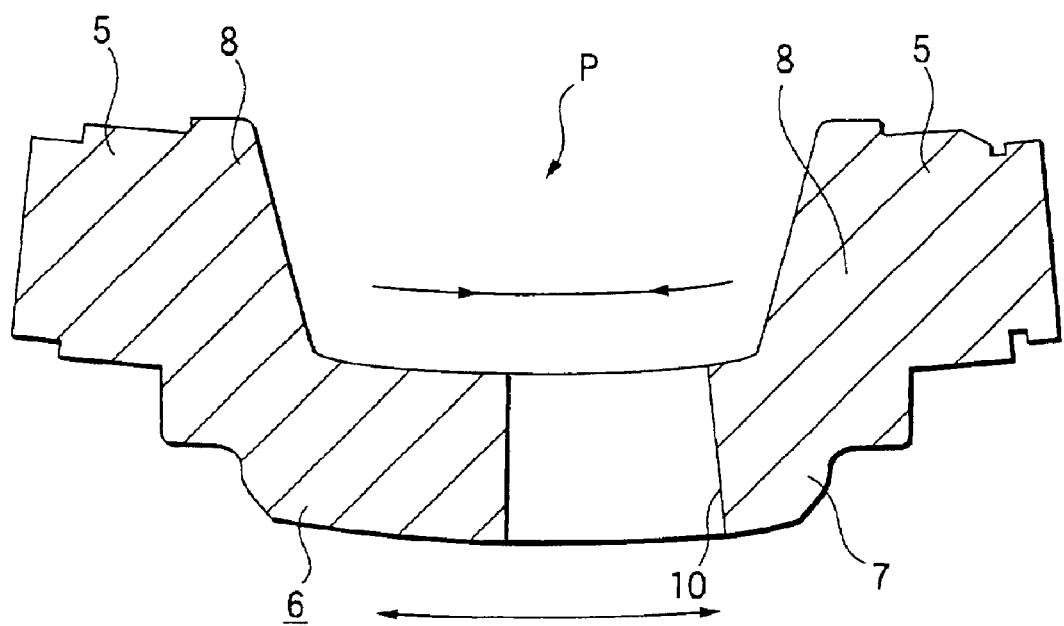
FIG. 21 is a section view of a specific shape of a trunnion, showing a state in which it is elastically deformed due to a thrust load.
Figure 22:
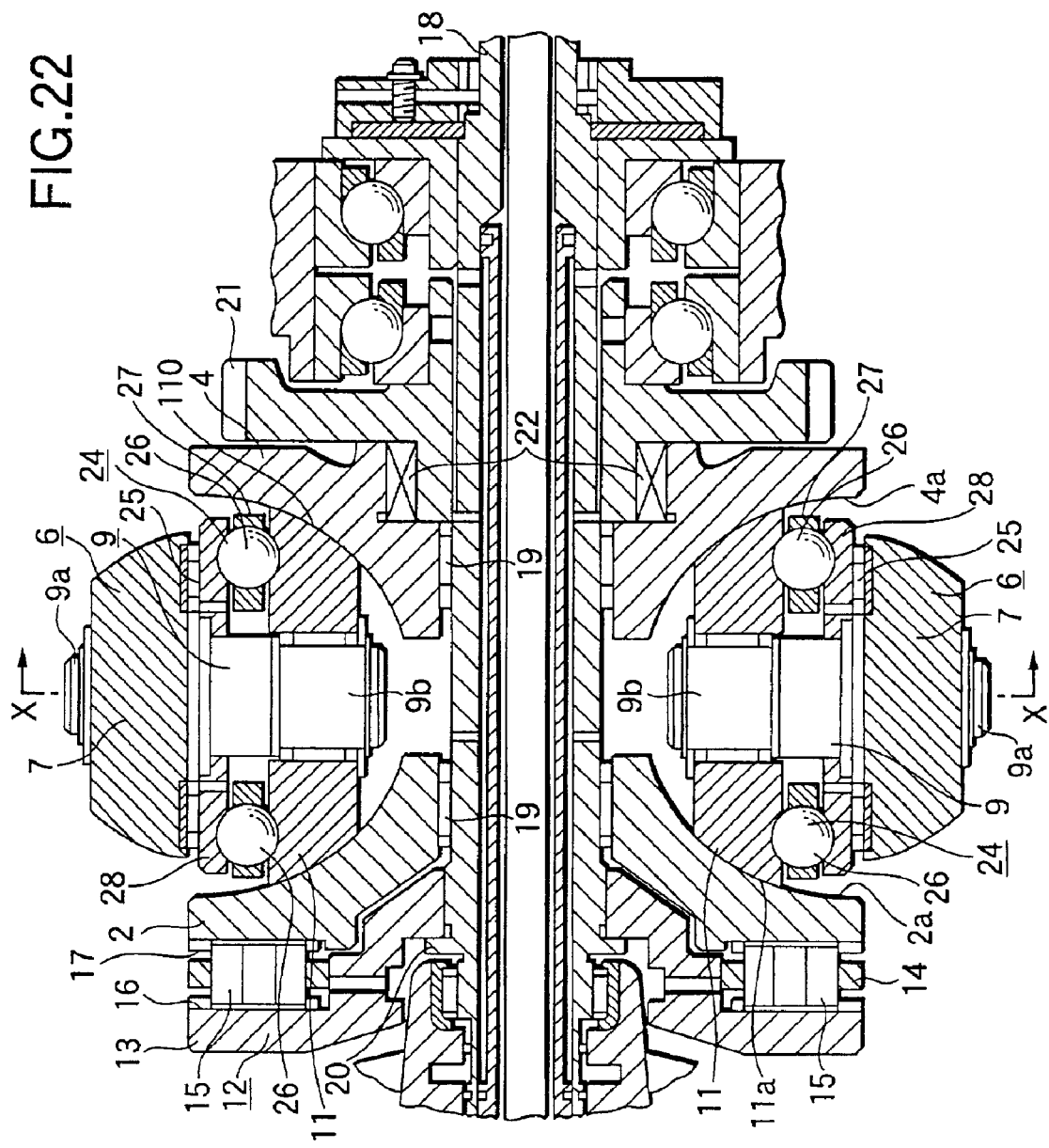
FIG. 22 is a section view of an example of the specific structure of a conventional toroidal-type continuously variable transmission.
Figure 23:
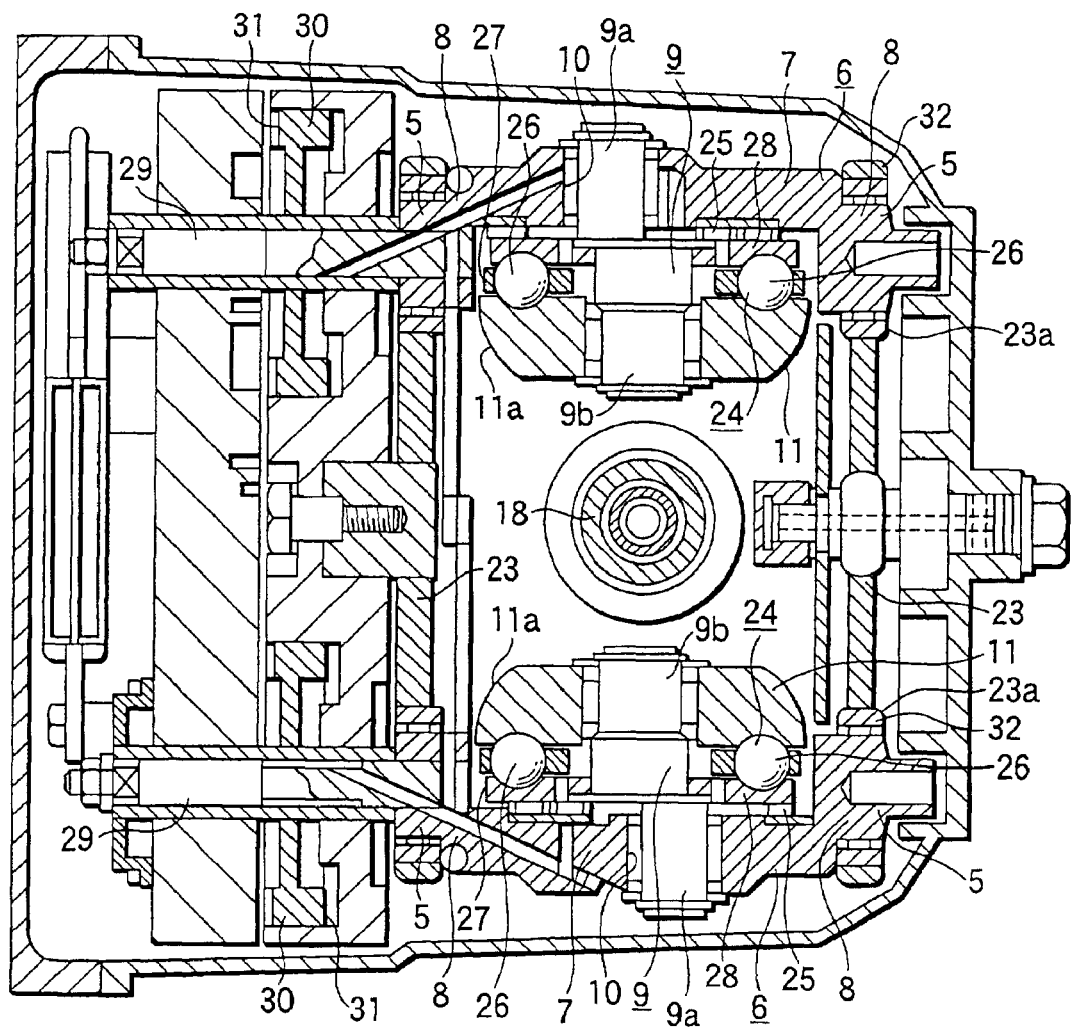
FIG. 23 is a section view taken along the line XXIII-XIII shown in FIG. 22.
Figure 24:
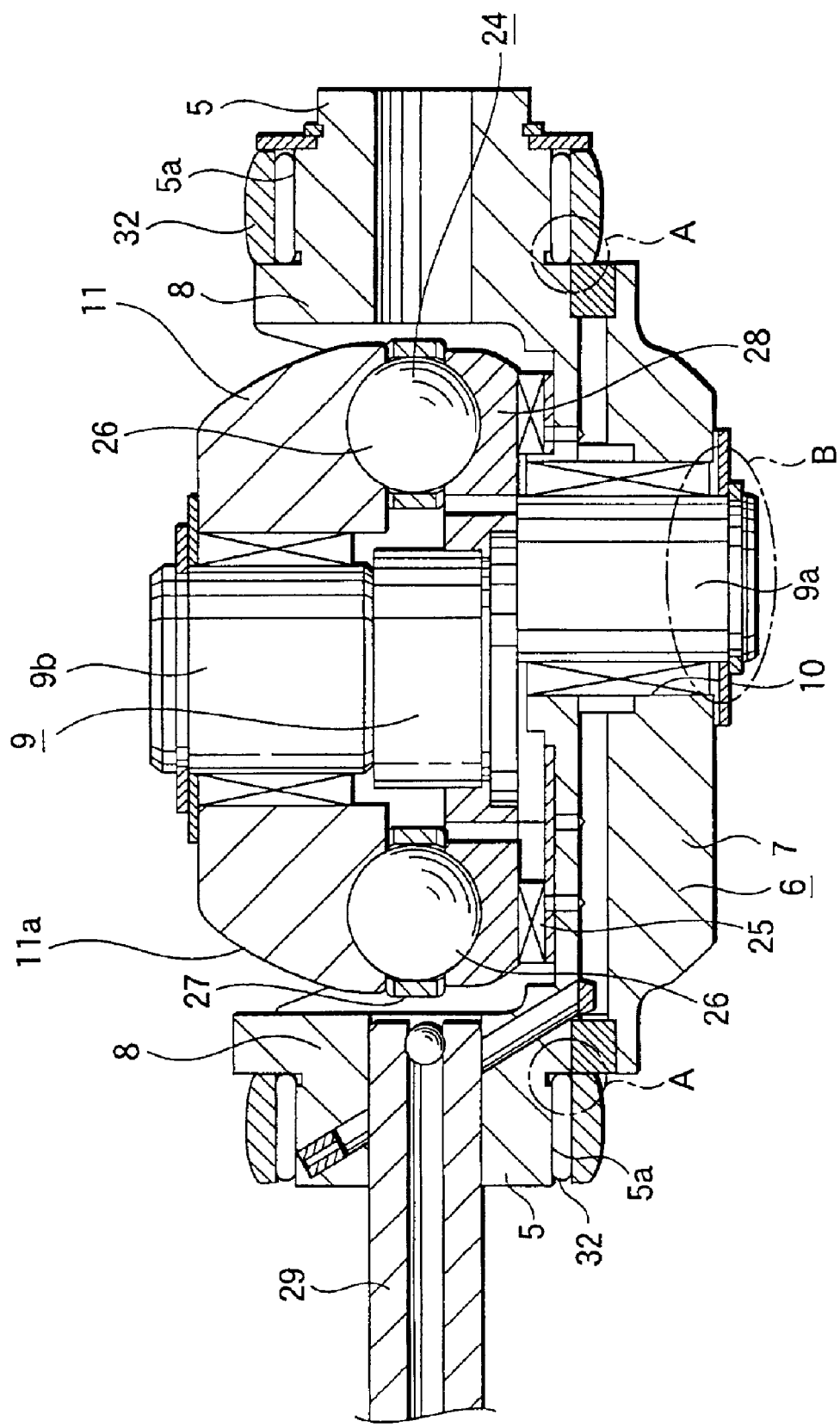
FIG. 24 is an enlarged section view of a conventional structure of a trunnion and a power roller.

Here, in the case of a trunnion 6 in which the connecting member 50 according to the present embodiment is not disposed, as shown in FIG. 18, the inclined rotational movement of the trunnion 6 can be prevented by the leading end portion 8a of the bent wall portion 8 because it is contacted with a stopper 43. Therefore, a heat treatment to be enforced on the trunnion 6 is carried out not only on the transfer surface portion 5a of the trunnion 6 but also on the leading end portion 8a of the bent wall portion 8. In this case, since the transfer surface portion 5a of the trunnion 6 and the leading end portion 8a of the bent wall portion 8 are situated near to each other, there is produced a portion C which is heat-treated twice. As a result of this, in the twice-heat-treated portion C, there occur quenching cracks and lowered hardness, which results in the lowered durability of the trunnion 6.

On the other hand, in the case of the structure according to the present embodiment, since the contact portions 53 of the connecting member 50 are contacted with the stopper 42, a heat treatment for prevention of wear is executed independently on the transfer surface 5a of the trunnion 6 and on the contact portions 53 of the connecting member 50 which is produced separately from the trunnion 6. Therefore, in the trunnion 6, there is eliminated the portion C which is heat-treated twice, which can prevent the lowered durability of the trunnion 6.

By the way, the invention is not limited to the above-mentioned embodiments but it goes without saying that various changes and modifications are also possible without departing from the scope of the gist of the invention. For example, in the above-mentioned modifications, as a fastening member, there are illustrated a pin and a bolt; however, the fastening member is not limited to them but there can also used splines and serrations.

Further, the stopper may also be integrally disposed on the lower surface of the support plate 23.

As has been described heretofore, according to the invention, since the trunnion and connecting member are produced separately from each other, they are easy to work and, at the same time, because the trunnion and connecting member are connected to each other through a fastening member, the connecting member can be prevented from slipping out of the trunnion. Also, since a pair of bent wall portions respectively disposed on the two end portions of the trunnion in the longitudinal direction thereof are connected together by the connecting member, the bending rigidity of the trunnion can be enhanced. Therefore, even in case where a thrust load is applied to the inner surface of a support plate portion constituting the trunnion with the operation of the toroidal-type continuously variable transmission, the trunnion is difficult to be elastically deformed.

Also, according to the invention, the fastening member is not fixed to both of the trunnion side and connecting member side but only one end portion of the fastening member is fixed to the connecting member or trunnion to thereby allow the trunnion and connecting member to move with respect to each other. Thanks to this, the power from the trunnion can be transmitted to the connecting member smoothly without applying an unreasonable load to the fastening member and its peripheral portion. This allows the connecting member to fulfil its original function sufficiently. Also, since the close connection between the trunnion and connecting member is not perfect close connection, the trunnion and connecting member are easy to work, fit and assemble.

Further, according to the invention, because the connecting member is interposed between the bent wall portions which form the pocket portion, the respective bent wall portions are difficult to be elastically deformed in a direction where they approach each other, thereby being able to enhance the bending rigidity of the trunnion further.

Still further, according to the invention, since the contact portion of the connecting member is contacted with the stopper, a heat treatment for prevention of wear is enforced separately on the inclined rotation surface of the trunnion and on the contact portion of the connecting member. Therefore, the heat treatment is executed once on the trunnion, not twice, which can prevent the lowered durability of the trunnion.

What is claimed is:

1. A toroidal-type continuously variable transmission, comprising:

first and second disks each including an inner surface, said first and second disks being disposed concentrically and rotatably such that the respective inner surfaces are opposed to each other;

a trunnion swingable about pivot shafts disposed at twisted positions with respect to center axes of said first and second disks;

a displacement shaft supported on said trunnion;

a power roller held between said first and second disks while being rotatably supported on the periphery of said displacement shaft; and a bearing allowing the rotation of said power roller while supporting a load applied to said power roller in a thrust direction, wherein:

said trunnion includes a support plate portion for supporting said displacement shaft and a pair of bent wall portions respectively bent toward the inner surface side of said support plate portion;

said support plate portion and said pair of bent wall portions cooperate together in defining a pocket portion for storing said power roller therein;

said pivot shafts are disposed concentrically with each other on the outer surfaces of said pair of bent wall portion;

said pair of bent wall portions are connected together by a connecting member; and a first end portion of said connecting member is connected to a first bent wall portion of said pair of bent wall portions by a first fastening member that is disposed parallel with the pivot shafts.

2. The toroidal-type continuously variable transmission according to claim 1, wherein only one end portion of said fastening member is fixed to one of said connecting member and said first bent wall portion, thereby allowing said connecting member and said first bent wall portion to move with respect to each other along the axial direction of said fastening member.

3. The toroidal-type continuously variable transmission according to claim 1, wherein a second end portion of said connecting member is connected to a second bent wall portion of said pair of bent wall portions by a second fastening member.

4. The toroidal-type continuously variable transmission according to claim 1, wherein said connecting member is disposed within said pocket portion.

5. The toroidal-type continuously variable transmission according to claim 1, wherein a stopper is disposed in the vicinity of said trunnion, for preventing the swing motion of said trunnion about said pivot shafts from going beyond an allowed limit thereof, and a contact portion to be contacted with said stopper is formed in said connecting member.

6. A toroidal-type continuously variable transmission, comprising:

first and second disks each including an inner surface, said first and second disks being disposed concentrically and rotatably such that the respective inner surfaces are opposed to each other;

a trunnion swingable about pivot shafts disposed at twisted positions with respect to center axes of said first and second disks;

a displacement shaft supported on said trunnion;

a power roller held between said first and second disks while being rotatably supported on the periphery of said displacement shaft; and a bearing allowing the rotation of said power roller while supporting a load applied to said power roller in a thrust direction, wherein:

said trunnion includes a support plate portion for supporting said displacement shaft and a pair of bent wall portions respectively bent toward the inner surface side of said support plate portion;

said support plate portion and said pair of bent wall portions cooperate together in defining a pocket portion for storing said power roller therein;

said pivot shafts are disposed concentrically with each other on the outer surfaces of said pair of bent wall portions;

said pair of bent wall portions are connected together by a connecting member at an opposite side of said support plate portion with respect to said pocket portion; and the connecting member is connected to the bent wall portion by a fastening member that is disposed parallel with the pivot shafts.

7. The toroidal-type continuously variable transmission according to claim 1, wherein said connecting member is formed in a linear shape.

8. The toroidal-type continuously variable transmission according to claim 6, wherein the connecting member is connected to the bent wall portion by a plurality of fastening members disposed parallel with the pivot shafts.

9. A toroidal-type continuously variable transmission, comprising:

first and second disks each including an inner surface, said first and second disks being disposed concentrically and rotatably such that the respective inner surfaces are opposed to each other;

a trunnion swingable about pivot shafts disposed at twisted positions with respect to center axes of said first and second disks;

a displacement shaft supported on said trunnion;

a power roller held between said first and second disks while being rotatably supported on the periphery of said displacement shaft; and a bearing allowing the rotation, of said power roller while supporting a load applied to said power roller in a thrust direction, wherein:

said trunnion includes a support plate portion for supporting said displacement shaft and a pair of bent wall portions respectively bent toward the inner surface side of said support plate portion;

said support plate portion and said pair of bent wall portions cooperate together in defining a pocket portion for storing said power roller therein;

said pivot shafts are disposed concentrically with each other on the outer surfaces of said pair of bent wall portions;

said pair of bent wall portions are connected together by a connecting member; and a first end portion of said connecting member is connected to a first bent wall portion of said pair of bent wall portions by a first fastening member, and only one end portion of said fastening member is fixed to one of said connecting member and said first bent wall portion, thereby allowing said connecting member and said first bent wall portion to move with respect to each other along the axial direction of said fastening member.

* * * * *